United States Patent
Kidron et al.

(10) Patent No.: US 8,224,247 B2
(45) Date of Patent: Jul. 17, 2012

(54) CONTROLLER INTEGRATED AUDIO CODEC FOR ADVANCED AUDIO DISTRIBUTION PROFILE AUDIO STREAMING APPLICATIONS

(75) Inventors: Amihai Kidron, Moshav Sitriyya (IL); Ran Katz, Givataim (IL); Ran Irony, Hod Hasharon (IL); Eli Dekel, Tzur Igal (IL)

(73) Assignee: Texas Instruments Incorporated, Dallas, TX (US)

( * ) Notice: Subject to any disclaimer, the term of this patent is extended or adjusted under 35 U.S.C. 154(b) by 1101 days.

(21) Appl. No.: 12/119,458

(22) Filed: May 12, 2008

(65) Prior Publication Data

US 2008/0287063 A1 Nov. 20, 2008

Related U.S. Application Data

(60) Provisional application No. 60/938,399, filed on May 16, 2007.

(51) Int. Cl.
*H04B 7/00* (2006.01)
(52) U.S. Cl. .......... 455/41.2; 455/553.1; 455/127.4; 370/473; 725/131
(58) Field of Classification Search .......... 455/41.2, 455/418, 553.1, 127.4; 370/395.64, 473; 725/131, 132; 719/328
See application file for complete search history.

(56) References Cited

U.S. PATENT DOCUMENTS

| | | | |
|---|---|---|---|
| 6,711,245 B1 * | 3/2004 | Mardinian et al. | 379/93.28 |
| 7,178,106 B2 * | 2/2007 | Lamkin et al. | 715/716 |
| 7,218,977 B2 * | 5/2007 | Lorenzen et al. | 700/94 |
| 7,379,661 B2 * | 5/2008 | Lamkin et al. | 386/248 |
| 7,451,460 B2 * | 11/2008 | Birnbaum et al. | 719/328 |
| 7,454,515 B2 * | 11/2008 | Lamkin et al. | 709/232 |
| 7,487,534 B1 * | 2/2009 | Peterka et al. | 725/131 |
| 7,587,255 B1 * | 9/2009 | Lorenzen et al. | 700/94 |
| 7,895,610 B1 * | 2/2011 | Dasgupta | 719/328 |
| 8,031,886 B2 * | 10/2011 | Kageyama et al. | 381/119 |
| 8,050,203 B2 * | 11/2011 | Jacobsen et al. | 370/310 |
| 2001/0043234 A1 * | 11/2001 | Kotamarti | 345/746 |
| 2004/0220926 A1 * | 11/2004 | Lamkin et al. | 707/3 |
| 2005/0166232 A1 * | 7/2005 | Lamkin et al. | 725/43 |
| 2006/0041639 A1 * | 2/2006 | Lamkin et al. | 709/219 |
| 2006/0190616 A1 * | 8/2006 | Mayerhofer et al. | 709/231 |
| 2007/0168191 A1 * | 7/2007 | Bodin et al. | 704/257 |
| 2007/0259621 A1 * | 11/2007 | Lin et al. | 455/41.2 |
| 2007/0280209 A1 * | 12/2007 | Ramani | 370/356 |
| 2008/0077468 A1 * | 3/2008 | Raskin | 705/10 |
| 2008/0235021 A1 * | 9/2008 | Cross et al. | 704/257 |
| 2009/0296920 A1 * | 12/2009 | Cox | 379/406.07 |

OTHER PUBLICATIONS

"Advanced Audio Distribution Profile Specification", Bluetooth Audio Video Working Group, Version 1.0, May 22, 2003.
"Generic Audio/Video Distribution Profile", Bluetooth Audio Video Working Group, Version 1.0, May 22, 2003.

* cited by examiner

*Primary Examiner* — Minh D Dao
(74) *Attorney, Agent, or Firm* — Alan A. R. Cooper; Wade James Brady, III; Frederick J. Telecky, Jr.

(57) ABSTRACT

A novel and useful apparatus for and method of integrating the advanced audio distribution profile (A2DP) audio codec into a Bluetooth controller for audio streaming applications. The mechanism functions to break the prior art Bluetooth protocol stack by integrating a profile packet composer into the controller. The profile/stack control signaling is performed by the host while the profile data packet composer is implemented in the controller. The integrated data packet composer does not break the data path and flow control over the standard HCI. Further, the integrated packet composer allows the controller to open a dedicated data interface for specific applications (e.g., PCM/I2S for audio data).

20 Claims, 16 Drawing Sheets

CONTROLLER INTEGRATED AUDIO CODEC FOR ADVANCED AUDIO DISTRIBUTION PROFILE AUDIO STREAMING APPLICATIONS

REFERENCE TO PRIORITY APPLICATION

This application claims priority to U.S. Provisional Application Ser. No. 60/938,399, filed May 16, 2007, entitled "Audio and Voice ASD", incorporated herein by reference in its entirety.

FIELD OF THE INVENTION

The present invention relates to the field of data communications and more particularly relates to a controller integrated audio codec for advanced audio distribution profile (A2DP) audio streaming applications.

BACKGROUND OF THE INVENTION

Currently, there is huge demand for converged mobile devices which combine data and telephony capabilities. Technological advances such as extremely low power consumption, improvements in form factor, pricing and co-existence technology for 802.11 (WLAN) and Bluetooth are fueling the demand.

Wireless communication devices such as WLAN and Bluetooth devices are generally constrained to operate in a certain frequency band of the electromagnetic spectrum. The use of frequency bands is licensed by government regulatory agencies, for example, the U.S. Federal Communications Commission (FCC) and the European Radio Communications Office. Licensing is necessary in order to prevent interference between multiple broadcasters trying to use the same frequency band in an area.

Regulatory agencies also specify frequency bands for devices that emit radio frequencies, where licensing is not required. Wireless communication devices using these unlicensed frequency bands generally transmit at low power over a small area. The Industrial, Scientific, or Medical equipment (ISM) band is one such frequency band located between 2.4 and 2.5 GHz. This 2.4 GHz band is used by many wireless communication devices for data and/or voice communication networks.

An example of such a network is defined by the Bluetooth specification. Bluetooth specifies communication protocols for low cost, low power wireless devices that operate over a very small area, the so-called, personal area network. These wireless devices may include, for example, telephone headsets, cell phones, Internet access devices, personal digital assistants, laptop computers, etc. The Bluetooth specification effectively replaces cables used to connect communicating devices, for example, a cell phone and a headset, with a wireless radio link to provide greater ease of use by reducing the tangle of wires frequently associated with personal communication systems. Several such personal communication devices may be wirelessly linked together by using the Bluetooth specification, which derives its name from Harald Blatand (Blatand is Danish for Bluetooth), a 10th century Viking king who united Denmark and Norway.

Bluetooth is an industrial specification for wireless personal area networks (PANs). Bluetooth provides a way to connect and exchange information between devices such as mobile phones, printers, PCs, laptops, and other digital equipment, over a secure, globally unlicensed short-range radio frequency (RF).

Bluetooth is a radio standard and communications protocol primarily designed for low power consumption, with a short range based on low-cost transceiver integrated circuits (ICs) in each device. Bluetooth networks enable these devices to communicate with each other when they are in range.

Bluetooth capability is increasingly built-in to many new products such as phones, printers, modems and headsets. Bluetooth is appropriate for situations when two or more devices are in proximity to each other and do not require high bandwidth. Bluetooth is most commonly used with phones and hand-held computing devices, either using a Bluetooth headset or transferring files from phones/PDAs to computers.

Bluetooth also simplified the discovery and setup of services, in contrast to WLAN which is more analogous to a traditional Ethernet network and requires configuration to set up shared resources, transmit files, set up audio links (e.g., headsets and hands-free devices), whereas Bluetooth devices advertise all the services they provide; thus making the service more accessible, without the need to worry about network addresses, permissions, etc.

Because Bluetooth devices operate in the unlicensed 2.4 GHz RF band, they are subject to radio interference from other wireless devices operating in the same frequency band. To avoid RF interference, the Bluetooth specification divides the 2.4 to 2.5 GHz frequency band into 1 MHz-spaced channels. Each channel signals data packets at 1 Mb/s, using a Gaussian Frequency Shift Keying modulation scheme. A Bluetooth device transmits a modulated data packet to another Bluetooth device for reception. After a data packet is transmitted and received, both devices retune their radio to a different 1 MHz channel, effectively hopping from radio channel to radio channel, i.e., frequency-hopping spread spectrum (FHSS) modulation, within the 2.4 to 2.5 GHz frequency band. In this way, Bluetooth devices use most of the available 2.4 to 2.5 GHz frequency band and if a particular signal packet transmission/reception is compromised by interference on one channel, a subsequent retransmission of the particular signal packet on a different channel is likely to be effective.

Bluetooth devices operate in one of two modes: as a Master device or a Slave device. The Master device provides a network clock and determines the frequency hopping sequence. One or more Slave devices synchronize to the Master's clock and follow the Master's hopping frequency.

Bluetooth is a time division multiplexed system, where the basic unit of operation is a time slot of 625 microsecond duration. The Master device first transmits to the Slave device during a first time slot of 625 microseconds with both devices tuned to the same RF channel. Thus, the Master device transmits and the Slave device receives during the first time slot. Following the first time slot, the two devices retune their radios, or hop, to the next channel in the frequency hopping sequence for the second time slot. During the second time slot, the Slave device must respond whether it successfully understood, or not, the last packet transmitted by the Master during the first time slot. The Slave device thus transmits and the Master device receives during the second time slot. As a Slave device must respond to a Master's transmission, communication between the two devices requires at a minimum two time slots or 1.25 milliseconds.

Data packets, when transmitted over networks, are frequently susceptible to delays by, for example, retransmissions of packets caused by errors, sequence disorders caused by alternative transmission pathways, etc. Packet delays do not cause much of a problem with the transmission of digital data because the digital data may be retransmitted or re-sequenced by the receiver without effecting the operation of computer programs using the digital data. Packet delays or dropped packets during the transmission of voice signals, however, can cause unacceptable quality of service.

The Bluetooth specification version 1.1 provides a Synchronous Connection Oriented (SCO) link for voice packets that is a symmetric link between Master and Slave devices with periodic exchange of voice packets during reserved time slots. The Master device transmits SCO packets to the Slave device at regular intervals, defined as the SCO interval or $T_{SCO}$, which is counted in time slots. Bandwidth limitations limit the Bluetooth specification to a maximum of three SCO links. Therefore, the widest possible spacing for an SCO pair of time slots, which are sometimes called a voice slot, is every third voice slot. Bluetooth specification version 1.2 provides enhanced SCO links, i.e. eSCO links, which have a larger voice slot size, based on N*625 microsecond time slots, with larger and configurable intervals between voice slots. These eSCO links can be used for both voice or data applications.

Advanced Audio Distribution Profile (A2DP)

The Bluetooth Advanced Audio Distribution Profile (A2DP) defines the protocols and procedures that realize distribution of audio content of high-quality in mono or stereo on ACL channels. The term "advanced audio", is distinguished from "Bluetooth audio", which indicates distribution of narrowband voice on SCO channels. A typical usage case is the streaming of music content from a stereo music player to headphones or speakers. As music playback becomes more and more common is almost every wireless terminal, the Bluetooth audio streaming feature via A2DP needs to be implemented in each platform.

A block diagram illustrating an example prior art Bluetooth based audio system is shown in FIG. 1. The system, generally referenced 10, comprises a storage device 12 for storing music and audio files, mobile terminal host processor 14 with MP3 decoder 16, analog codec 18 and headset or headphones 19. The host processor receives MP3 files (or other audio file format) from the storage device and decodes their contents using the MP3 decoder. Analog audio is generated by the analog codec from the decoded audio output from the host processor.

The audio data is compressed in a proper format for efficient use of the limited bandwidth. Note that the A2DP focuses on audio streaming, while the Video Distribution Profile (VDP) specifies video streaming. Support of both profiles enables the distribution of video content accompanied with high-quality audio. The source role of the A2DP must support Low Complexity Subband Codec (SBC) encoding of audio data, which is a significant consumer of processor resources.

A diagram illustrating the prior art Bluetooth A2DP audio streaming protocol model is shown in FIG. 2. A2DP is the Bluetooth profile for wireless audio headphone enabled audio streaming applications. It uses the Logical Link Control and Adaptation Protocol (L2CAP) and Audio/Video Data Transport Protocol (AVDTP) protocols. L2CAP is the Bluetooth standard data multiplexer layer and AVDTP is used on top of L2CAP.

The system, generally referenced 50, comprises a server (SRC) side 54 and client (SNK) side 52. Each side comprises a physical layer 60, data link layer 58 and application layer 57 (i.e. audio SRC on the server side and audio SNK on the client side). The basebands of each side are coupled via PHY link 55. A logical data link 53 connects the LMP 62 and L2CAP 64 protocols in the data link layer. Similarly, logical link 51 conveys audio/video signaling while logical link 68 conveys audio/video streaming media between the Audio/Video Distribution Transport Protocol (AVDTP) 56 on each side of the link.

A block diagram illustrating an example prior art host and Bluetooth controller A2DP audio streaming implementation in more detail is shown in FIG. 3. The system, generally referenced 20, comprises a storage device 22, mobile terminal host processor 24, Bluetooth controller 40 and Bluetooth headset 48. The controller 40 comprises HCI 42 and radio 44 coupled to antenna 46. The host processor 24 comprises MP3 decoding 26 and Bluetooth stack and profiles 28. The stack and profiles comprise A2DP setup and control 30, SBC encoding 32, AVDTP framing 34, L2CAP packaging 36 and host controller interface (HCI) 38.

In operation, audio from the MP3 decoder is encoded by the SBC encoder block 32. Audio and control signaling are exchanged between the host processor and the controller via audio and control path 49. The audio is sent to the headphones over the air from the radio in the controller.

In most headsets, the standard Bluetooth host controller interface (HCI) is used as the interface between the host and the Bluetooth controller wherein (1) L2CAP and AVDTP are implemented in the host software; (2) the audio streaming is handled over the HCI interface; and (3) the Bluetooth host software is responsible for encoding the A2DP audio stream and packaging it into AVDTP and L2CAP packets.

A block diagram illustrating the Bluetooth core system architecture is shown in FIG. 4. The system, generally referenced 430, comprises Bluetooth controller 432 and L2CAP layer 434. The controller comprises several layers including radio payer 440 with RF block 454, baseband layer 442 with link controller 452 and baseband resource manager 450, link manager layer 444 with link manager 448 and device manager 446 and HCI 443. The baseband resource manager handles synchronous unframed traffic and communicates with the L2CAP resource manager 436 in the L2CAP layer 434 and the link manager which communicates with the channel manager 438. The L2CAP layer 434 handles asynchronous and isochronous framed traffic.

The standard A2DP implementation, however, requires audio transcoding, usually from a popular audio format such as MP3 to SBC. The SBC encoder requirements are approximately 15 MIPS. In addition, support of Bluetooth audio headphone applications is required in low end handsets, which typically have limited processing power. Thus, integration of Bluetooth audio streaming applications into these handsets is very complex and results in numerous limitations on supported use cases.

Therefore, there is a need for a mechanism that enables the implementation of Bluetooth A2DP audio streaming in devices such as low end handsets having limited processing power. The mechanism also should reduce the processing power required by the host processor and enable the support of advanced use cases in the handset. Further, the mechanism should simplify the integration of Bluetooth audio streaming applications into handset platforms and reduce the integration effort on a per platform basis.

SUMMARY OF THE INVENTION

The present invention is a novel and useful apparatus for and method of integrating the advanced audio distribution profile (A2DP) audio codec into a Bluetooth controller for audio streaming applications. The mechanism functions to break the prior art Bluetooth protocol stack by integrating a profile packet composer into the controller. The profile/stack control signaling is performed by the host while the profile data packet composer is implemented in the controller. The integrated data packet composer does not break the data path and flow control over the standard HCI. Further, the integrated packet composer allows the controller to open a dedicated data interface for specific applications (e.g., PCM/I2S for audio data).

In similar fashion, partitioning can also be adapted to the SNK side of A2DP, reducing the required processing power of the host and enabling smoother integration. For the SNK implementation, a similar partitioning and associated mechanism is used on the SNK side as is used on the SRC side. On the SNK side, the controller integrates the receive packets over the air, parses them and sends the data over the dedicated data interface (e.g., PCM/I2S for audio data).

The invention helps to support the rapid increase in wireless platforms that are required to support high quality audio streaming capabilities. In order to provide such capabilities, the source role of the A2DP must support Low Complexity Subband Codec (SBC) encoding of audio data, which is a significant consumer of processor resources. The controller integrated audio codec of the present invention enables offloading the host CPU (HCPU) in A2DP source role implementation by performing the SBC encoding internally in the Bluetooth device. All the data path processing of the A2DP profile is performed by the Bluetooth controller, while the signaling channel remains and control functions are performed by the HCPU.

Although the mechanism of the present invention can be used in numerous types of communication systems, to aid in illustrating the principles of the present invention, the description of the controller integrated A2DP audio codec mechanism is provided in the context of a Bluetooth radio enabled communication device such as a cellular phone.

Although the coexistence mechanism of the present invention can be incorporated in numerous types of Bluetooth enabled communication devices such a multimedia player, cellular phone, PDA, etc., it is described in the context of a cellular phone. It is appreciated, however, that the invention is not limited to the example applications presented, whereas one skilled in the art can apply the principles of the invention to other communication systems as well without departing from the scope of the invention.

Several advantages of the controller integrated A2DP audio codec mechanism of the present invention include (1) the enablement of Bluetooth audio streaming applications in low end phones with limited processing power; (2) reducing the processing power required on the host processor to implement A2DP audio streaming; (3) enabling support of advanced use cases in the handset; (4) easing the integration of Bluetooth audio streaming applications into headset platforms; and (5) reducing the integration effort required per platform.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of encoding streaming audio in a controller coupled to a communications channel, the method comprising the steps of receiving audio streaming data from a host system, encoding the audio streaming data to generate encoded audio data therefrom and assembling transmit packets incorporating the encoded audio data for transmission over the communications channel.

There is also provided in accordance with the invention, a method of encoding streaming audio in a Bluetooth controller, the method comprising the steps of receiving pulse code modulated (PCM) format audio streaming data from a host system utilizing a host control application programming interface (API), encoding the PCM audio streaming data to subband codec (SBC) format and generating transmit packets incorporating the SBC encoded audio data for transmission over a Bluetooth link.

There is further provided in accordance with the invention, a Bluetooth subband codec (SBC) encoder comprising a host interface operative to receive a pulse code modulated (PCM) format input audio data stream from a host system, a SBC codec operative to encode the PCM audio data stream into SBC format and a profile data packet composer operative to encapsulate the SBC formatted audio data stream to generate Bluetooth transmit packets therefrom.

There is also provided in accordance with the invention, a single chip Bluetooth controller comprising a Bluetooth radio for establishing a link to a remote device, a host interface operative to receive a pulse code modulated (PCM) format input audio data stream from a host system, an audio encoder operative to encode the audio data stream into subband codec (SBC) format and a profile data packet composer operative to encapsulate the SBC formatted audio data stream to generate Bluetooth packets therefrom for transmission by the Bluetooth radio over the link to the remote device.

There is further provided in accordance with the invention, a software program product embodied in a computer-readable medium, comprising program instructions executable to implement a host interface for receiving pulse code modulated (PCM) format audio streaming data from a host system utilizing a host control application programming interface (API), an encoder operative to encode the PCM audio streaming data to subband codec (SBC) format and a profile data packet composer operative to encapsulate the SBC formatted audio data stream to generate transmit packets therefrom for transmission over a communications link to a remote device.

There is also provided in accordance with the invention, a software program product embodied in a computer-readable medium, comprising program instructions executable to implement a host control application programming interface (API) and wherein the API defines a plurality of commands for controlling and configuring a Bluetooth controller comprising an interface for receiving a pulse code modulated (PCM) audio data stream from a host system, an encoder for generating subband coding (SBC) formatted audio data and a profile data packet composer operative to encapsulate the SBC formatted audio data to generate Bluetooth packets therefrom.

There is further provided in accordance with the invention, a method of communicating between an application layer in a host system and a single chip Bluetooth controller incorporating an audio streaming codec and profile data packet composer, the method comprising the steps of opening an advanced audio distribution profile (A2DP) signaling and data channel, wherein data channel processing is performed by the Bluetooth controller while control functions and associated signaling channel are performed by the host system, opening an A2DP stream between the host system and the Bluetooth controller, configuring a plurality of subband codec (SBC) format encoder parameters, the SBC encoder integrated within the Bluetooth controller, starting the A2DP stream and receiving pulse code modulated (PCM) audio data, encoding the PCM audio data to SBC formatted audio data and composing Bluetooth transmit packets encapsulating the SBC formatted audio data.

There is also provided in accordance with the invention, a computer implemented method for processing pulse code modulated (PCM) audio streaming data in a Bluetooth controller, comprising receiving PCM audio streaming data from a host system utilizing a host control application programming interface (API), wherein the host control API defines a plurality of commands for controlling and configuring a Bluetooth controller, the controller comprising an integrated interface for receiving the PCM audio data stream from a host system, an integrated encoder for generating subband coding (SBC) formatted audio data and an integrated profile data packet composer operative to encapsulate the SBC formatted audio data to generate Bluetooth packets therefrom, wherein the API comprises a command for opening an advanced audio distribution profile (A2DP) channel between the host system and a remote Bluetooth device, wherein the API comprises a command for opening an A2DP stream between the host system and the Bluetooth controller, wherein the API comprises a command for configuring the Bluetooth controller with one or more related parameters, wherein the API comprises a command for starting an A2DP stream between the host system and the Bluetooth controller and receiving pulse code modulated (PCM) audio data, encoding the PCM audio data to SBC formatted audio data and composing Bluetooth transmit packets encapsulating the SBC formatted audio data.

There is further provided in accordance with the invention, a single chip Bluetooth controller comprising a Bluetooth radio for establishing a link to a remote device, a host control application programming interface (API) defining a plurality of commands for controlling and configuring the Bluetooth controller, a host interface operative to receive a pulse code modulated (PCM) format input audio data stream from a host system utilizing the host control API, an audio encoder operative to encode the audio data stream into subband codec (SBC) format and a profile data packet composer operative to encapsulate the SBC formatted audio data stream to generate Bluetooth transmit packets therefrom for transmission by the Bluetooth radio over the link to the remote device.

There is also provided in accordance with the invention, a method of decoding streaming audio in a controller coupled to a communications channel, the method comprising the steps of parsing receive packets incorporating encoded audio received over the communications channel, decoding the audio streaming data to generate decoded audio data therefrom and sending the decoded audio stream data to a host system.

There is further provided in accordance with the invention, a method of decoding streaming audio in a Bluetooth controller, the method comprising the steps of parsing receive packets incorporating subband codec (SBC) encoded audio data received over a Bluetooth link, decoding the SBC format data to pulse code modulated (PCM) format audio streaming data and sending the PCM format audio streaming data to a host system utilizing a host control application programming interface (API).

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
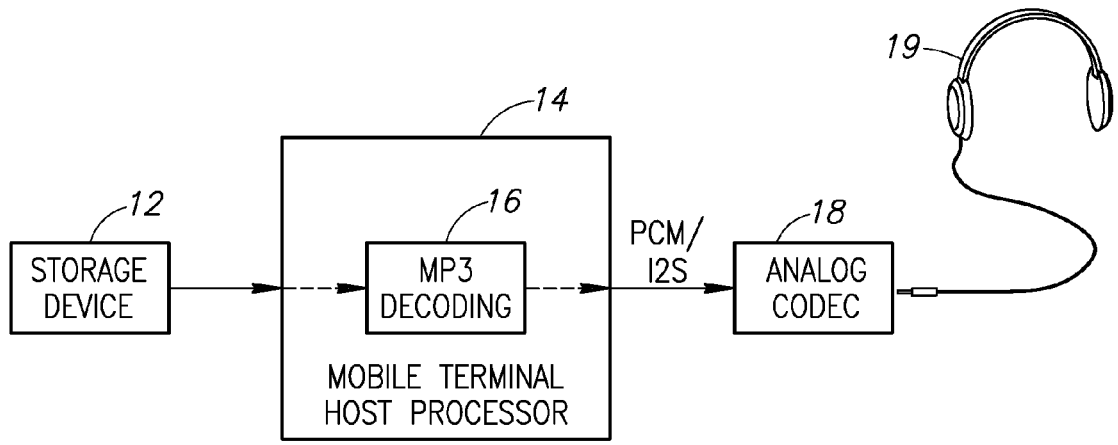
FIG. 1 is a block diagram illustrating an example prior art Bluetooth based audio system.
Figure 2:
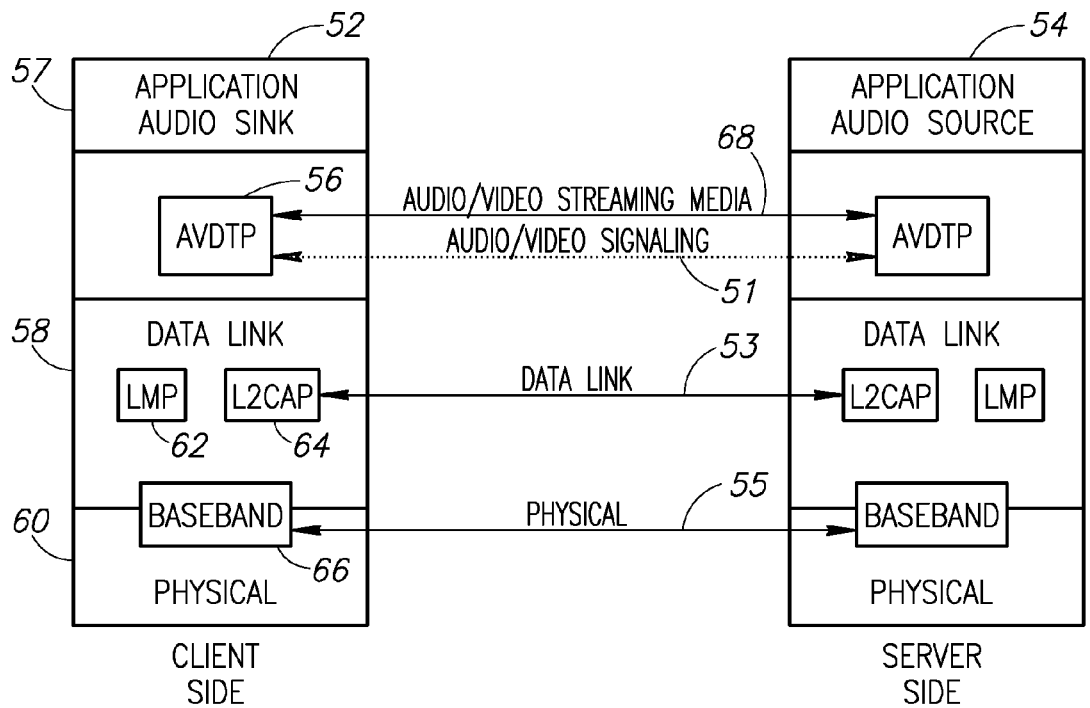
FIG. 2 is a diagram illustrating the prior art Bluetooth A2DP audio streaming protocol model.
Figure 3:
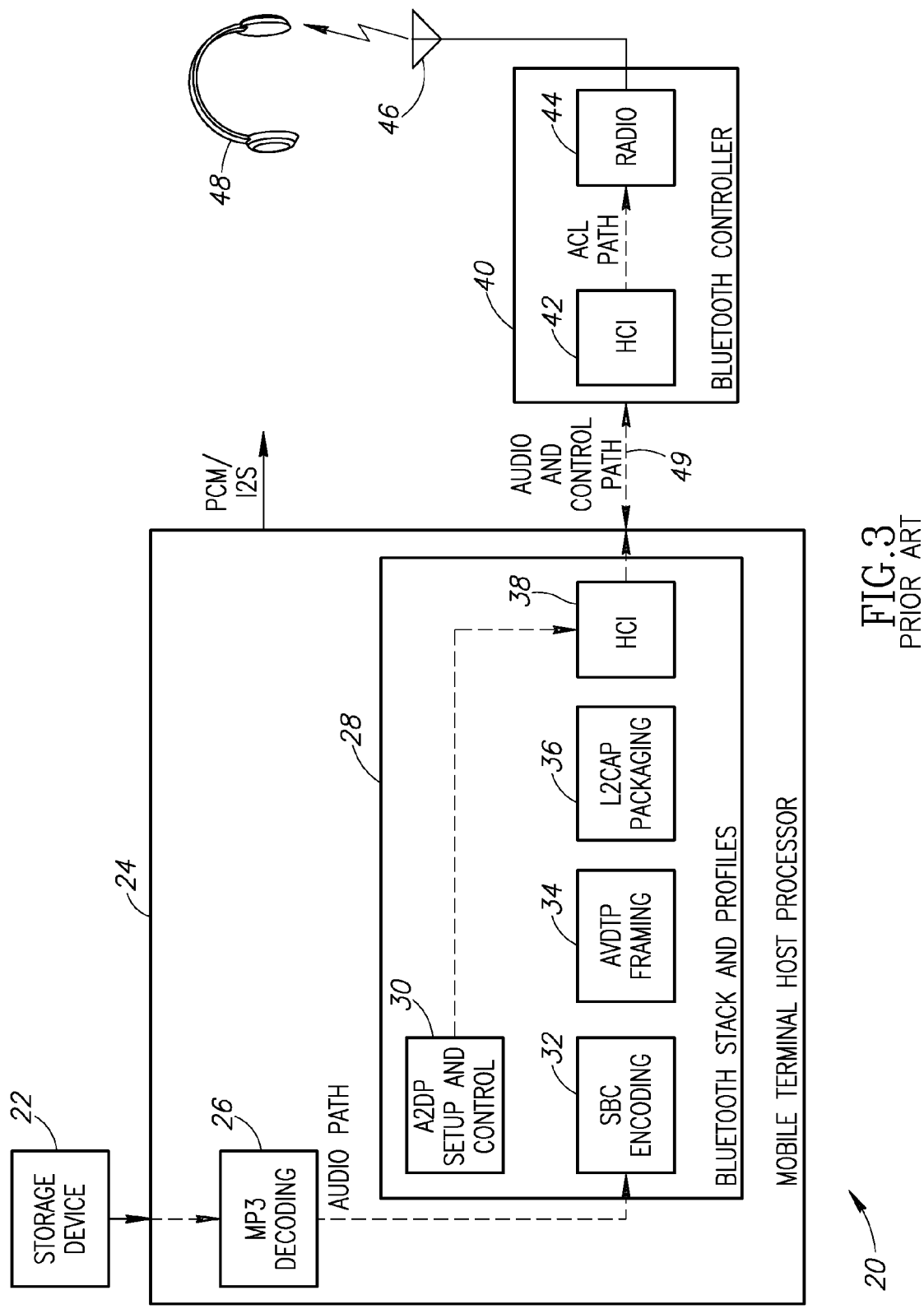
FIG. 3 is a block diagram illustrating an example prior art host and Bluetooth controller A2DP audio streaming implementation in more detail.
Figure 4:
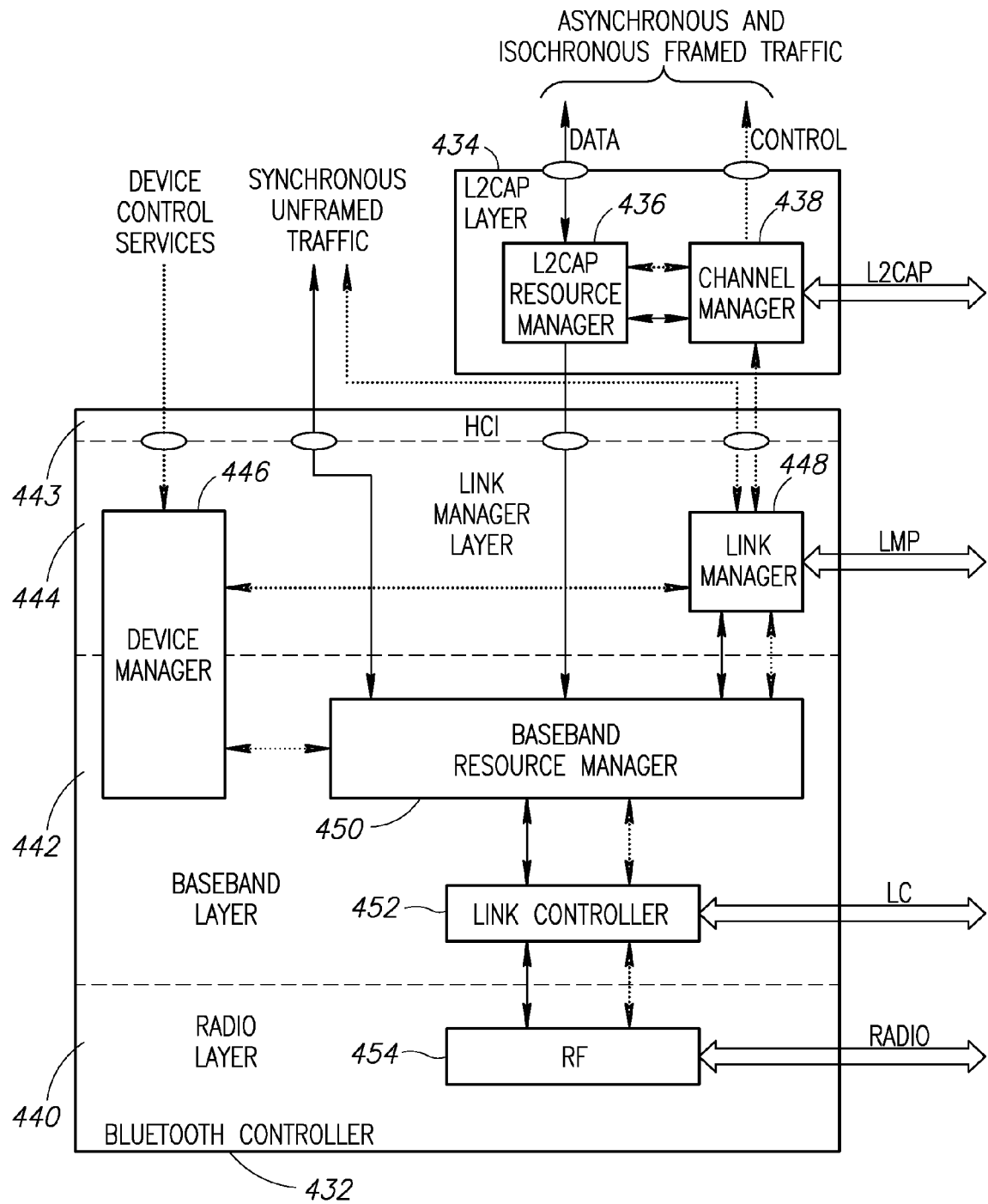
FIG. 4 is a block diagram illustrating the Bluetooth core system architecture.

The following notation is used throughout this document.

| Term | Definition |
|------|------------|
| A2PD | Advanced Audio Distribution Profile |
| AAA | Authentication Authorization and Accounting |
| AC | Alternating Current |
| ACL | Asynchronous Connectionless Link |
| API | Application Programming Interface |

-continued

| Term | Definition |
|---|---|
| APR | Audio Processor |
| ASIC | Application Specific Integrated Circuit |
| AVDTP | Audio Video Distribution Transport Protocol |
| AVI | Audio Video Interleave |
| BMP | Windows Bitmap |
| CPU | Central Processing Unit |
| DC | Direct Current |
| DFC | Data Flow Controller |
| DMA | Direct Memory Access |
| DSP | Digital Signal Processor |
| EDGE | Enhanced Data rates for GSM Evolution |
| EPROM | Erasable Programmable Read Only Memory |
| eSCO | Synchronous Connection Oriented |
| FCC | Federal Communications Commission |
| FHSS | Frequency Hopping Spread Spectrum |
| FM | Frequency Modulation |
| FPGA | Field Programmable Gate Array |
| GPRS | General Packet Radio Service |
| GPS | Ground Positioning Satellite |
| GSM | Global System for Mobile Communications |
| HCI | Host Control Interface |
| HCPU | Host Central Processing Unit |
| HDL | Hardware Description Language |
| IC | Integrated Circuit |
| ID | Identification |
| IEEE | Institute of Electrical and Electronics Engineers |
| ISM | Industrial, Scientific, Medical |
| JPG | Joint Photographic Experts Group |
| LAN | Local Area Network |
| MAC | Media Access Control |
| MP3 | MPEG-1 Audio Layer 3 |
| MPDU | MAC Protocol Data Unit |
| MPG | Moving Picture Experts Group |
| MSDU | MAC Service Data Unit |
| NIC | Network Interface Card |
| OFDMA | Orthogonal Frequency Division Multiple Access |
| PAN | Personal Area Network |
| PC | Personal Computer |
| PCI | Personal Computer Interconnect |
| PCM | Pulse Code Modulation |
| PCMI | Pulse Code Modulation Interface |
| PDA | Portable Digital Assistant |
| RAM | Random Access Memory |
| RAN | Radio Access Network |
| RAT | Radio Access Technology |
| RF | Radio Frequency |
| ROM | Read Only Memory |
| SBC | Complexity Subband Codec |
| SCO | Synchronous Connection Oriented |
| SDIO | Secure Digital Input/Output |
| SIM | Subscriber Identity Module |
| SNK | Sink |
| SPI | Serial Peripheral Interface |
| SRC | Source |
| TV | Television |
| UART | Universal Asynchronous Receive/Transmit |
| UMTS | Universal Mobile Telecommunication System |
| USB | Universal Serial Bus |
| UWB | Ultra Wideband |
| VDP | Video Distribution Profile |
| WB | Wideband |
| WiFi | Wireless Fidelity |
| WiMax | Worldwide Interoperability for Microwave Access |
| WiMedia | Radio platform for UWB |
| WLAN | Wireless Local Area Network |
| WMA | Windows Media Audio |
| WMV | Windows Media Video |

DETAILED DESCRIPTION OF THE INVENTION

The present invention is a novel and useful apparatus for and method of integrating the advanced audio distribution profile (A2DP) audio codec into a Bluetooth controller for audio streaming applications. The mechanism functions to break the prior art Bluetooth protocol stack by integrating a profile packet composer into the controller. The profile/stack control signaling is performed by the host while the profile data packet composer is implemented in the controller. The integrated data packet composer does not break the data path and flow control over the standard HCI. Further, the integrated packet composer allows the controller to open a dedicated data interface for specific applications (e.g., PCM/I2S for audio data).

Although the mechanism of the present invention can be used in numerous types of communication systems, to aid in illustrating the principles of the present invention, the description of the controller integrated A2DP audio codec mechanism is provided in the context of a Bluetooth radio enabled communication device such as a cellular phone.

Although the coexistence mechanism of the present invention can be incorporated in numerous types of Bluetooth enabled communication devices such a multimedia player, cellular phone, PDA, etc., it is described in the context of a cellular phone. It is appreciated, however, that the invention is not limited to the example applications presented, whereas one skilled in the art can apply the principles of the invention to other communication systems as well without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term 'Source' (SRC) denotes a device that acts as a source of a digital audio stream that is delivered to the sink (SNK) of a piconet. The term 'Sink' (SNK) denotes a device that acts as a sink of a digital audio stream delivered from the SRC on the same piconet. For example, a portable player is a SRC while a headset is a SNK. A microphone is a SRC while a portable recorder is a SNK.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device Incorporating the Controller Integrated Audio Codec

Figure 5:
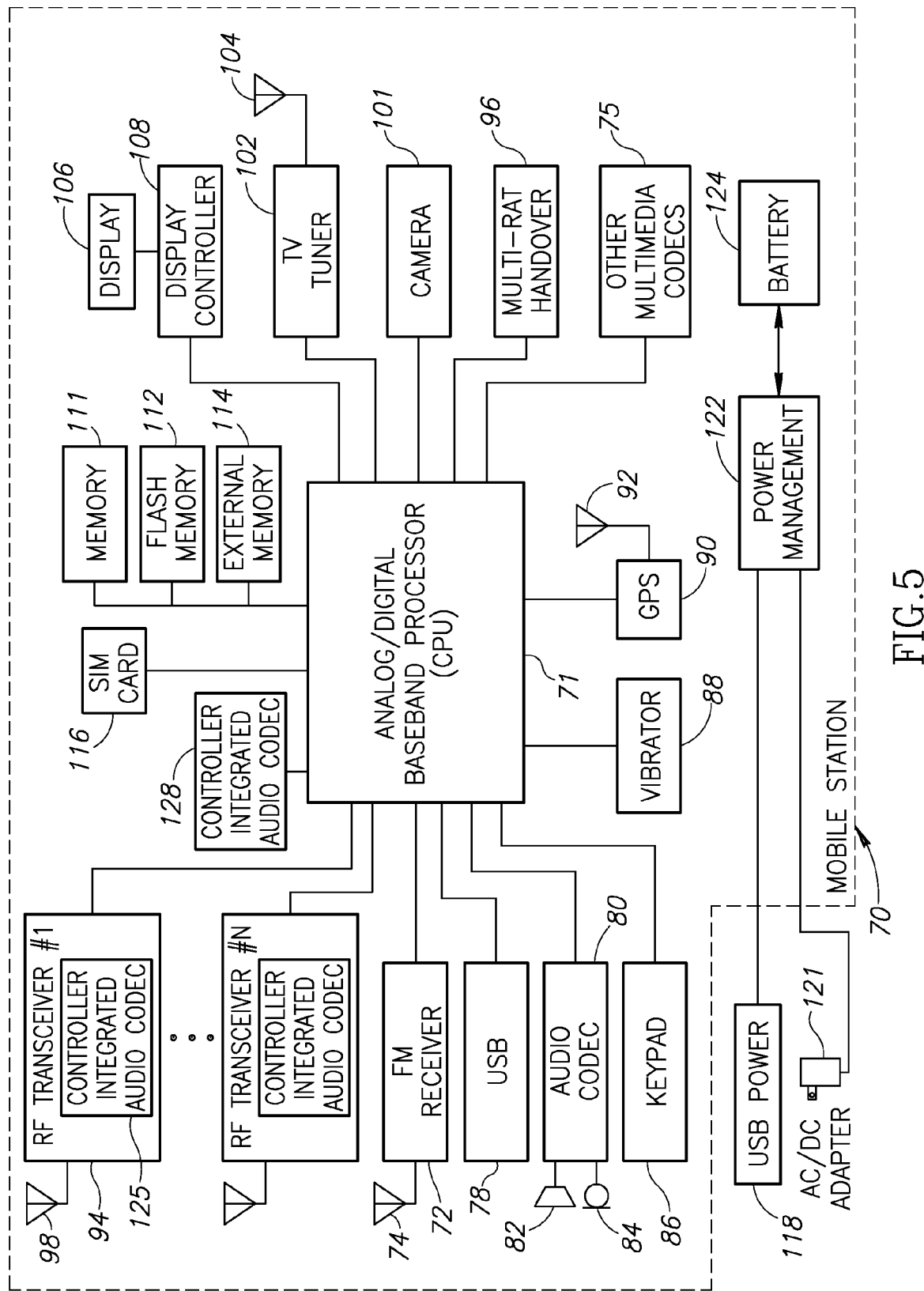
FIG. 5 is a general block diagram illustrating a communication device (shown generally as a mobile station or MS) incorporating the controller integrated audio codec of the present invention.

A general block diagram illustrating a communication device (shown generally as a mobile station or MS) incorporating the controller integrated audio codec of the present invention is shown in FIG. 5. Note that the mobile station may comprise any suitable wired or wireless device such as multimedia player, mobile communication device, cellular phone, smartphone, PDA, Bluetooth device, etc. For illustration purposes only, the device is shown as a mobile station. Note that this example is not intended to limit the scope of the invention as the controller integrated audio codec of the present invention can be implemented in a wide variety of communication devices.

The mobile station, generally referenced 70, comprises a baseband processor or CPU 71 having analog and digital portions. The MS may comprise a plurality of RF transceivers 94 and associated antennas 98. RF transceivers for the basic cellular link and any number of other wireless standards and radio access technologies (RATs) may be included. Examples include, but are not limited to, Global System for Mobile Communication (GSM)/GPRS/EDGE 3G; CDMA; WiMAX for providing WiMAX wireless connectivity when within the range of a WiMAX wireless network using OFDMA techniques; Bluetooth for providing Bluetooth wireless connectivity when within the range of a Bluetooth wireless network; WLAN for providing wireless connectivity when in a hot spot or within the range of an ad hoc, infrastructure or mesh based wireless LAN network; near field communications; 60 GHz device; UWB; etc. One or more of the RF transceivers may comprise a plurality of antennas to provide antenna diversity which yields improved radio performance. The mobile station may also comprise internal RAM and ROM memory 110, flash memory 112 and external memory 114.

Several user interface devices include microphone(s) 84, speaker(s) 82 and associated audio codec 80 or other multimedia codecs 75, a keypad for entering dialing digits 86, vibrator 88 for alerting a user, camera and related circuitry 100, a TV tuner 102 and associated antenna 104, display(s) 106 and associated display controller 108 and GPS receiver 90 and associated antenna 92. A USB or other interface connection 78 (e.g., SPI, SDIO, PCI, etc.) provides a serial link to a user's PC or other device. An FM receiver 72 and antenna 74 provide the user the ability to listen to FM broadcasts. SIM card 116 provides the interface to a user's SIM card for storing user data such as address book entries, etc. Note that the SIM card shown is intended to represent any type of smart card used for holding user related information such as identity and contact information, Authentication Authorization and Accounting (AAA), profile information, etc. Different standards use different names, for example, SIM for GSM, USIM for UMTS and ISIM for IMS and LTE.

The controller integrated audio codec may be implemented in the mobile station in any of several ways. In one embodiment, the controller integrated audio codec is implemented in the RF transceiver block 94, for the case where the RF transceiver comprises Bluetooth transceiver.

In another embodiment, the audio codec 80 comprises the controller integrated audio codec of the present invention. In this case, the audio codec is implemented as part of the Bluetooth controller. In yet another embodiment, the controller integrated audio codec is implemented as block 128 which functions as part of the Bluetooth controller. The controller integrated audio codec is adapted to implement the audio streaming mechanism of the present invention as described in more detail infra. In operation, controller integrated audio codec blocks may be implemented as hardware, software or as a combination of hardware and software. Implemented as a software task, the program code operative to implement the audio streaming mechanism of the present invention is stored in one or more memories 110, 112 or 114 or local memories within the baseband processor.

Portable power is provided by the battery 124 coupled to power management circuitry 122. External power is provided via USB power 118 or an AC/DC adapter 120 connected to the battery management circuitry which is operative to manage the charging and discharging of the battery 124.

Controller Integrated Audio Codec for A2DP

Figure 6:
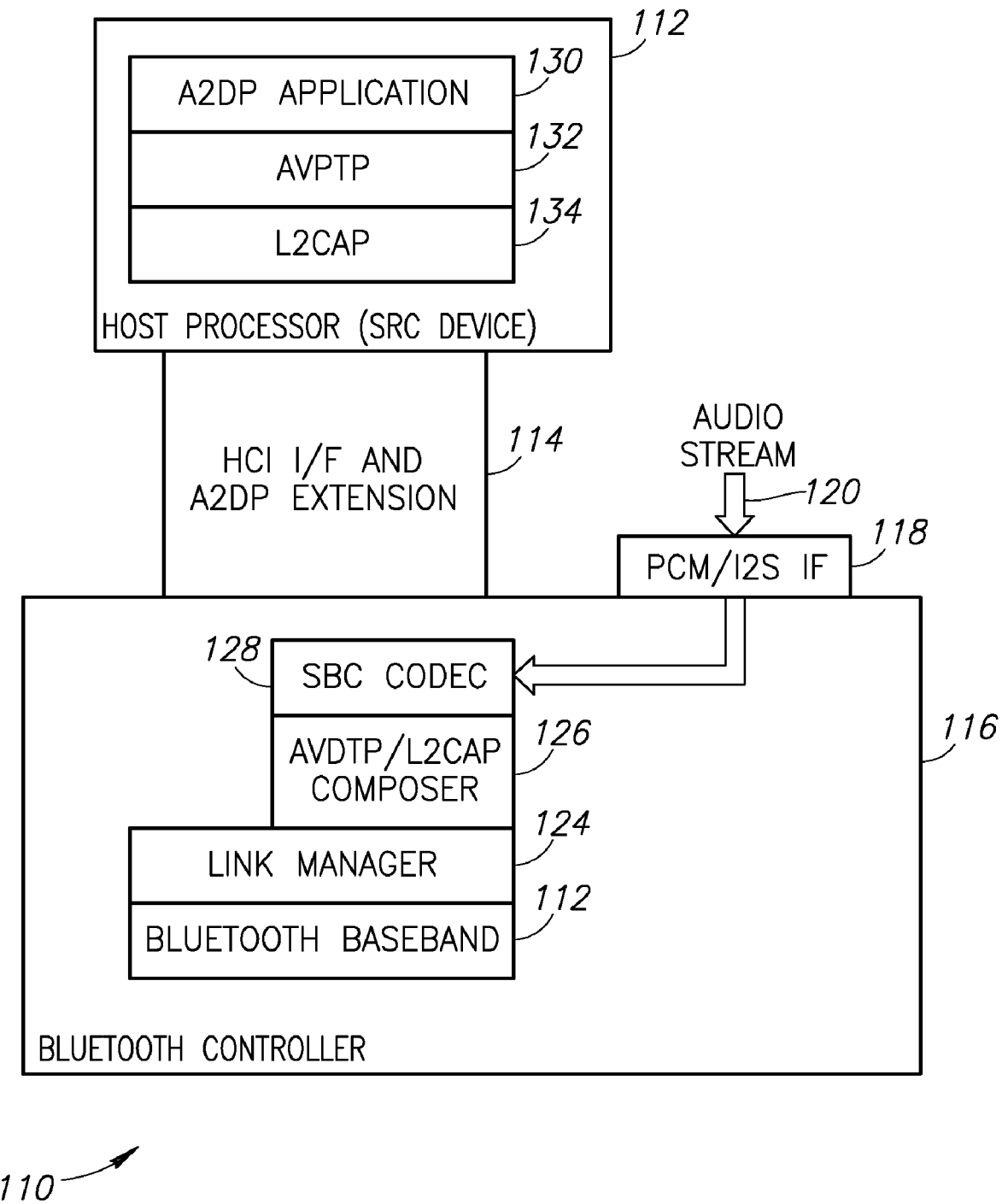
FIG. 6 is a diagram illustrating an example embodiment of the SRC based A2DP audio streaming implementation of the present invention.

A diagram illustrating an example embodiment of the SRC based A2DP audio streaming implementation of the present invention is shown in FIG. 6. The system, generally referenced 110, comprises a Bluetooth controller 116 in communication with a host processor 112 via HCI interface (I/F) and A2DP extension 114. The host processor comprises A2DP application layer 130, AVDTP layer 132 and L2CAP layer 134. The controller comprises SBC codec 128, AVDTP/L2CAP composer 126, link manager 124 and Bluetooth baseband 122.

In operation, audio stream data 120, such as previously read from a storage device and decoded by an MP3 decoder, is input to the controller via the PCM/I2S interface 118 and encoded by the SBC codec 128. AVDTP packets are encapsulated into L2CAP packets by the composer 126 and sent to the Bluetooth baseband 122 via the link manager 124.

Thus, in accordance with the invention, the audio codec and the AVDTP/L2CAP mini composer are integrated into the Bluetooth controller. The PCM/I2S provides a dedicated interface to receive the PCM audio samples. The AVDTP and L2CAP mini composer is responsible for composing AVDTP audio packets based on preconfigured AVDTP parameters, both components of which are configured by the host processor.

Note that the AVDTP 132, L2CAP 134 and A2DP application 130 running on the host are responsible for the protocol functions as in the standard implementation. Note also that the invention uses the standard Bluetooth HCI with appropriate extensions to control the AVDTP/L2CAP mini composer and codec components.

Figure 7:
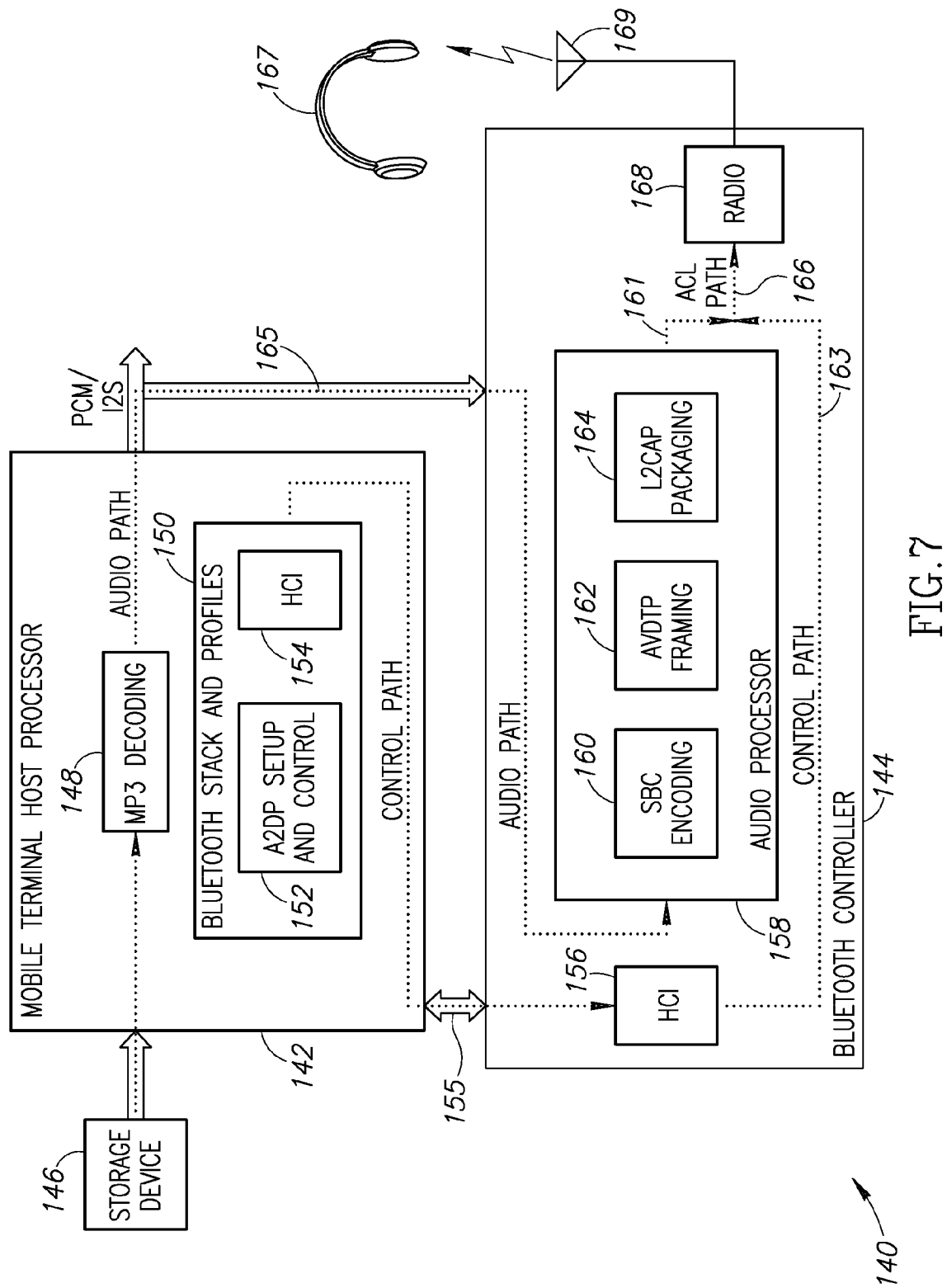
FIG. 7 is a block diagram illustrating an example embodiment of the A2DP audio streaming implementation of the present invention in more detail.

A block diagram illustrating an example embodiment of the A2DP audio streaming implementation of the present invention in more detail is shown in FIG. 7. The system, generally referenced 140, comprises a storage device 146, mobile terminal host processor 142 and Bluetooth controller 144. The host processor 142 comprises MP3 decoder 148, stack and profiled 150 which comprise A2DP setup and control block 152 and HCI 154. The controller 144 comprises HCI 156, radio 168 and audio processor 158 which comprises SBC encoder 160, AVDTP framer 162 and L2CAP packager 164.

To support high quality audio streaming, the source role of the A2DP must support Low Complexity Subband Codec (SBC) encoding of audio data, which normally is a significant consumer of processor resources. The controller integrated audio codec of the present invention is operative to off-load the host CPU (HCPU) in A2DP source role implementation by performing the SBC encoding internally in the Bluetooth device. Thus, all the data path processing of the A2DP profile is performed by the Bluetooth controller 144, while the signaling channel 155/163 remains and control functions are performed by the HCPU 142.

In operation, MP3 data or other supported formatted audio data is read from the storage device 146 and decoded by the decoder 148 (e.g., MP3 decoder). The audio data path (dotted line) is input to the controller via the PCM/I2S interface 165. The audio stream is transferred from the host 142 to the controller 144 in PCM format on the PCM bus 165 (as opposed to coded audio frames via the common ACL transport (UART, SDIO, SPI) as is done in the prior art).

In accordance with the invention, the HCPU uses a novel HCI VS API in order to control and configure the controller with the required parameters, A2DP SNK capabilities, etc. which are negotiated and set up by the HCPU via the signaling channel 155/163. The audio processor 158 is the entity that performs the data processing internally within the controller.

The L2CAP packets output of the audio processor are input to the radio via the ACL path 161 along with the control signaling 163. The radio transmits the data and signaling to the A2DP enabled headset 167 via antenna 169.

Note that for A2DP purposes, the SBC codec only needs perform encoding since the Bluetooth core targets audio source applications. The AVDTP frames generated by the AVDTP framer 162 are sent over an ACL link 161 as L2CAP packets via L2CAP packaging 164. This requires that the transmit path include the ACL data path managed by the firmware on the audio processor 158.

Over time, SBC has become he standard codec of Bluetooth. Thus, a core with an integrated codec can significantly ease the integration between the Bluetooth controller and the host. An architecture for the integrated SBC codec in the Bluetooth core is described below in connection with FIGS. 8 and 9.

Figure 8:
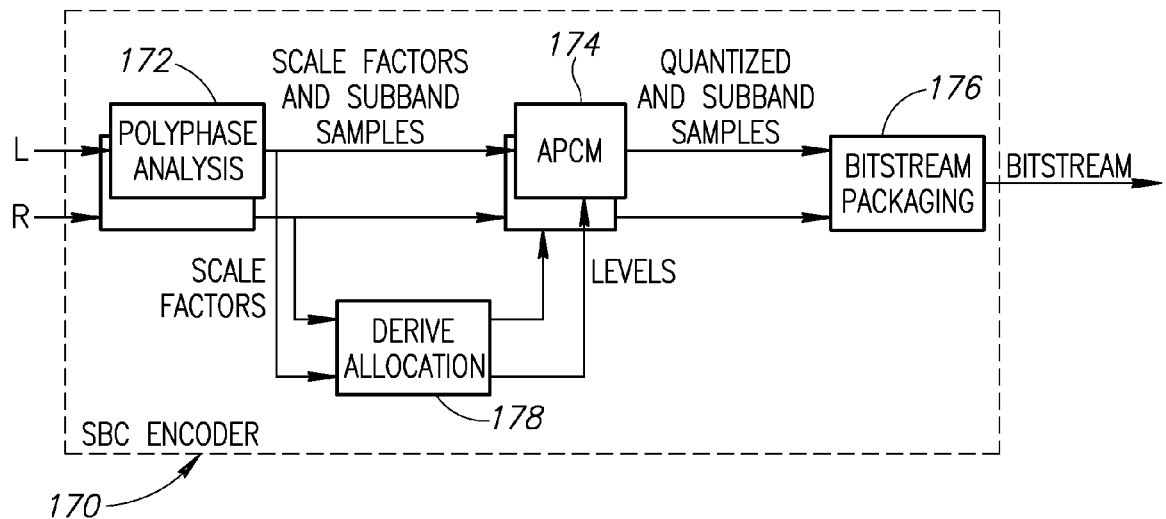
FIG. 8 is a block diagram illustrating the SBC encoder in more detail.

A block diagram illustrating the SBC encoder in more detail is shown in FIG. 8. The SBC encoder, generally referenced 170, comprises left/right polyphase analysis blocks 172, APCM blocks 174, bitstream packaging block 176 and derive allocation block 178.

The polyphase analysis blocks are operative to split the input PCM signal into subband samples and calculate the scale factors (i.e. a maximum level of each subband). The number of subbands can be four or eight. The derive allocation block functions to derive the subband levels in accordance with the scale factors and SBC parameters (e.g., bitpool). The APCM block functions to quantize the subband samples according to the levels calculated by the derive allocation block. The bitstream packaging block composes the SBC frame from its various inputs (i.e. header data, left and right APCM output, etc.).

Figure 9:
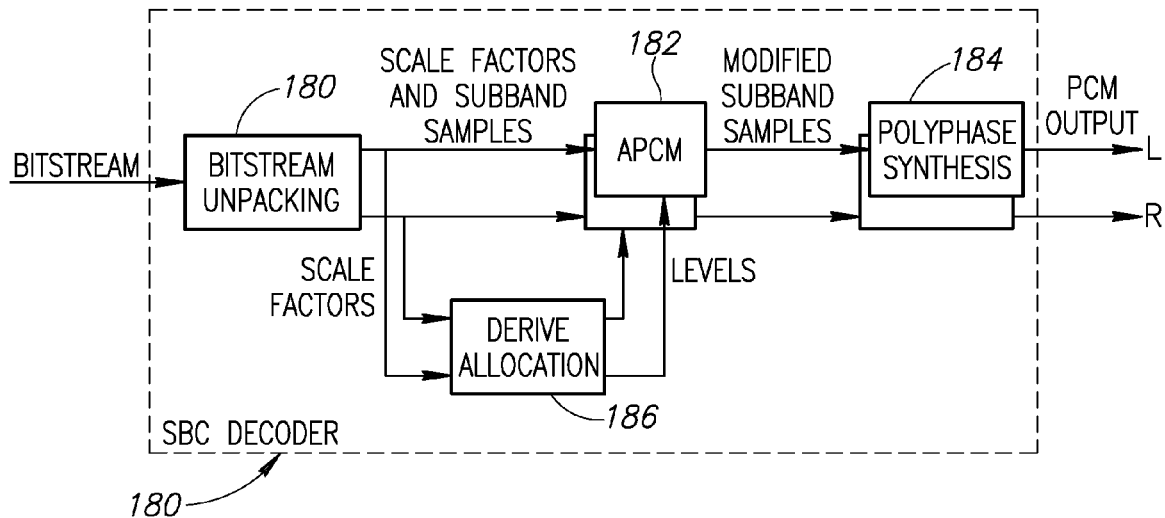
FIG. 9 is a block diagram illustrating the SBC decoder in more detail.

A block diagram illustrating the SBC decoder in more detail is shown in FIG. 9. The SBC decoder, generally referenced 180, comprises bitstream unpacking block 180, APCM blocks 182, left/right polyphase synthesis blocks 184 and derive allocation block 186. The description of the decoder is similar to the encoder with the difference being the order of operations is reversed.

Figure 10:
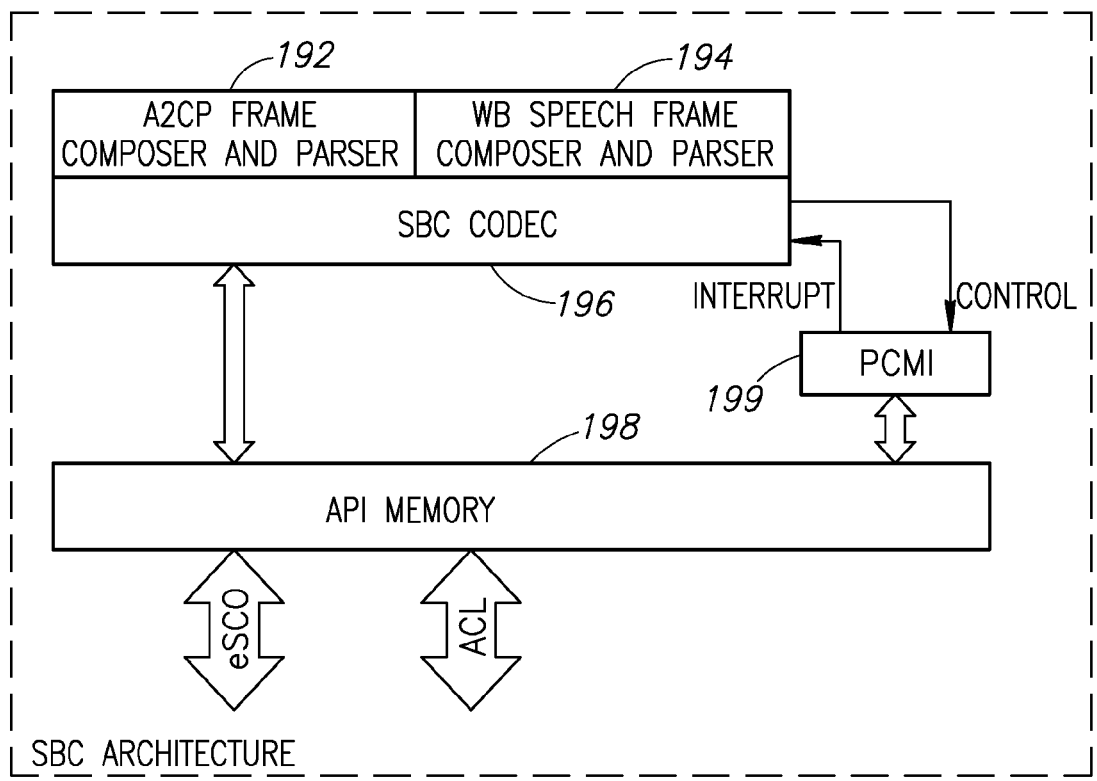
FIG. 10 is a block diagram illustrating an example of the SBC implementation of the present invention in more detail.

The SBC codec can be implemented on the audio processor 158 (FIG. 7). A block diagram illustrating an example of SBC architecture in more detail is shown in FIG. 10. The SBC architecture, generally referenced 190, comprises three main components: namely the SBC codec 196, A2DP frame composer 192 and WB speech frame composer and parser 194.

The SBC codec is operative to package and unpack SBC frames. The codec also controls the PCMI interface 199 and interfaces with API memory 198. The A2DP frame composer is operative to compose AVDTP packets. The WB speech frame composer and parser is responsible for adding and filtering the synchronization headers of the WB speech frames and for performing resynchronization when required.

Figure 11:
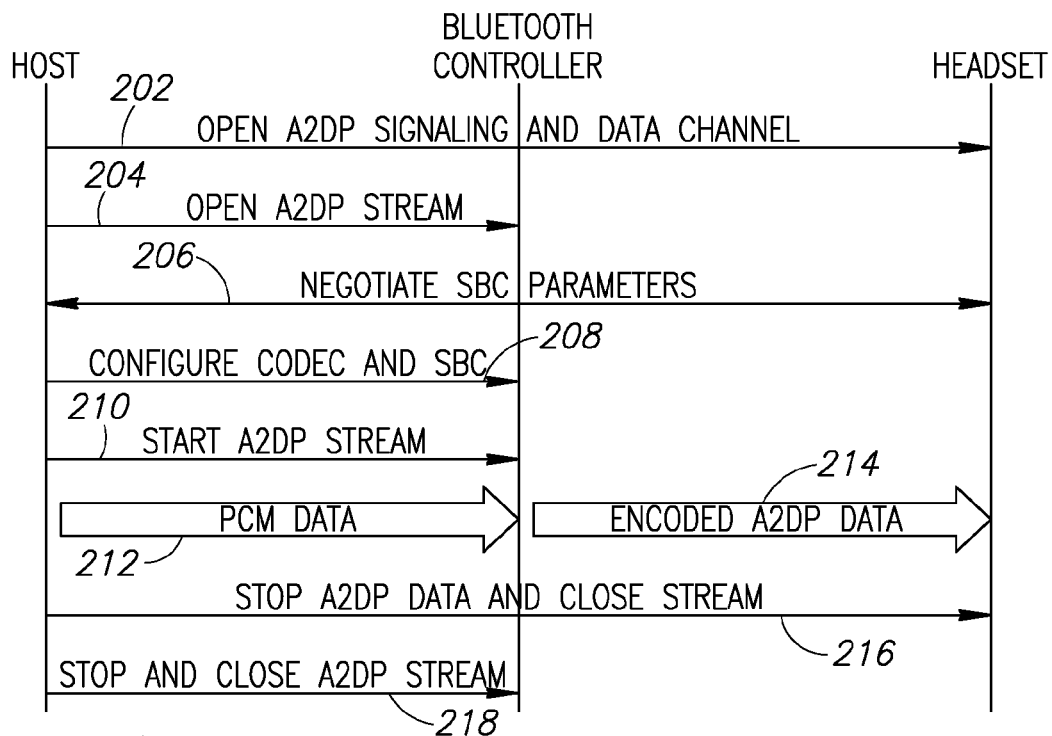
FIG. 11 is a diagram illustrating the message flow between the host, Bluetooth controller and headset for a single audio stream.

A diagram illustrating the message flow between the host, Bluetooth controller and headset for a single audio stream is shown in FIG. 11. The following diagram demonstrates the roles performed by and the message flow between the HCPU and the controller during a typical A2DP session. Initially, an A2DP data and signaling channel is opened between the host and the headset (signaling via the controller) (202). The A2DP audio stream is then opened between the host and controller (204). The host and headset negotiate one or more SBC parameters between themselves (206). The codec and SBC encoder are configured (208) and the A2DP audio stream is started (210). The host sends PCM data to the controller (212) which encodes and encapsulates it in AVDTP/L2CAP packets and transmits the encoded A2DP data to the headset over the radio link (214). At some point, the A2DP data is stopped and the stream between the host and headset is closed (216). The A2DP stream between the host and controller is stopped and closed (218).

Figure 12:
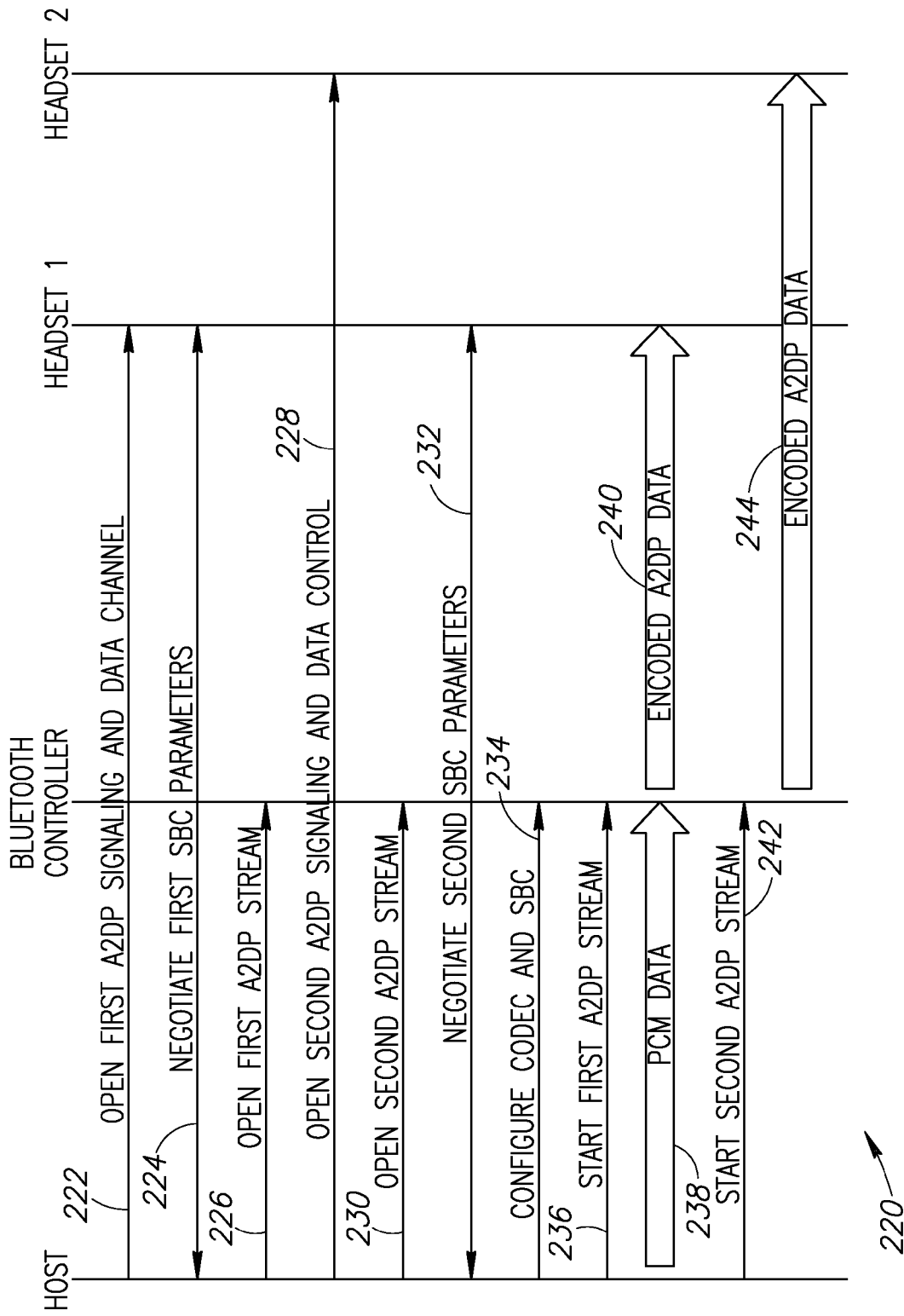
FIG. 12 is a diagram illustrating the message flow between the host, Bluetooth controller and headset for multiple audio streams.

The A2DP profile supports audio transmission to two SNK devices simultaneously. In accordance with the invention, the HCPU is responsible only for the signaling channel as in the case of a single SNK scenario presented in FIG. 11 supra. A multiple SNK flow sequence diagram is presented in FIG. 12.

The diagram illustrates the message flow between the host, Bluetooth controller and headset for multiple audio streams.

Initially, the first A2DP data and signaling channel is opened between the host and headset #1 (signaling via the controller) (222). The first SBC parameters related to headset #1 are negotiated (224). The first A2DP audio stream is opened between the host and controller (226). The second A2DP data and signaling channel is opened between the host and headset #2 (signaling via the controller) (228). The second A2DP audio stream is opened between the host and controller (230). The host and headset #2 negotiate one or more SBC parameters between themselves (232). The codec and SBC encoder are configured (234) and the first A2DP audio stream is started (236). The host sends PCM data to the controller (238) which encodes and encapsulates it in AVDTP/L2CAP packets and transmits the encoded A2DP data to headset #1 over the radio link (240). The second A2DP audio stream is started (242) and encoded A2DP data is sent to headset #2 over the radio link (244). At some point, the A2DP data to headset #1 and #2 is stopped and the streams between the host and headset are closed. The A2DP streams between the host and controller are stopped and closed as well.

Note that, as described infra in connection with the API, the SBC codec configuration command (HCI_VS_A3DP_Codec_Configuration) is called only once for both streams, as there is only a single set of SBC parameters for encoding at a given time. Thus, if second SNK SBC parameters are negotiated when another SNK is already streaming, then SBC configuration should be reconfigured in the event the parameter set of both SNKs do not match.

Regarding interference between the two SNKs, if one of the two SNKs experiences poor RF performance, the affect on the other SNK is minimal. For example, consider the case of one user being far from the cellular phone while another user is much closer. The closer user should still hear smooth audio music. In that case, SBC frames of the poor RF performing SNK only would be flushed thereby enabling steady audio streaming for the good SNK.

A2DP over PCM Data Flow

Figure 13:
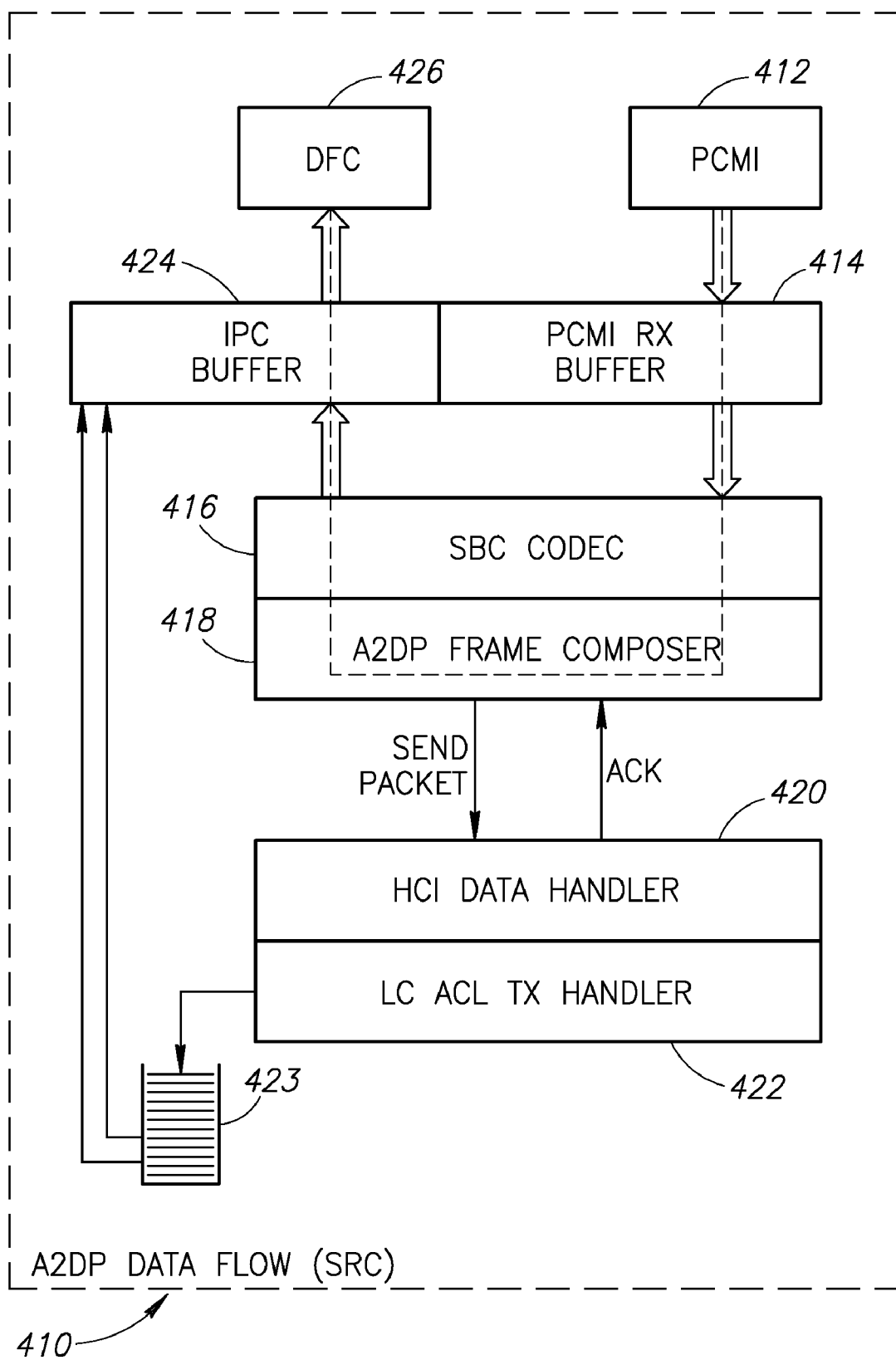
FIG. 13 is a diagram illustrating the SRC based A2DP over PCM data flow.

A diagram illustrating the SRC based A2DP over PCM data flow is shown in FIG. 13. The data flow, generally referenced 410, comprises PCM interface (PCMI) 412, PCMI RX buffer 414, SBC codec 416, A2DP frame composer 418, HCI data handler 420, LC ACL TX handler 422, queue 423, Inter Processor Communication (IPC) buffer 424 and Data Flow Controller (DFC) 426.

Figure 14:
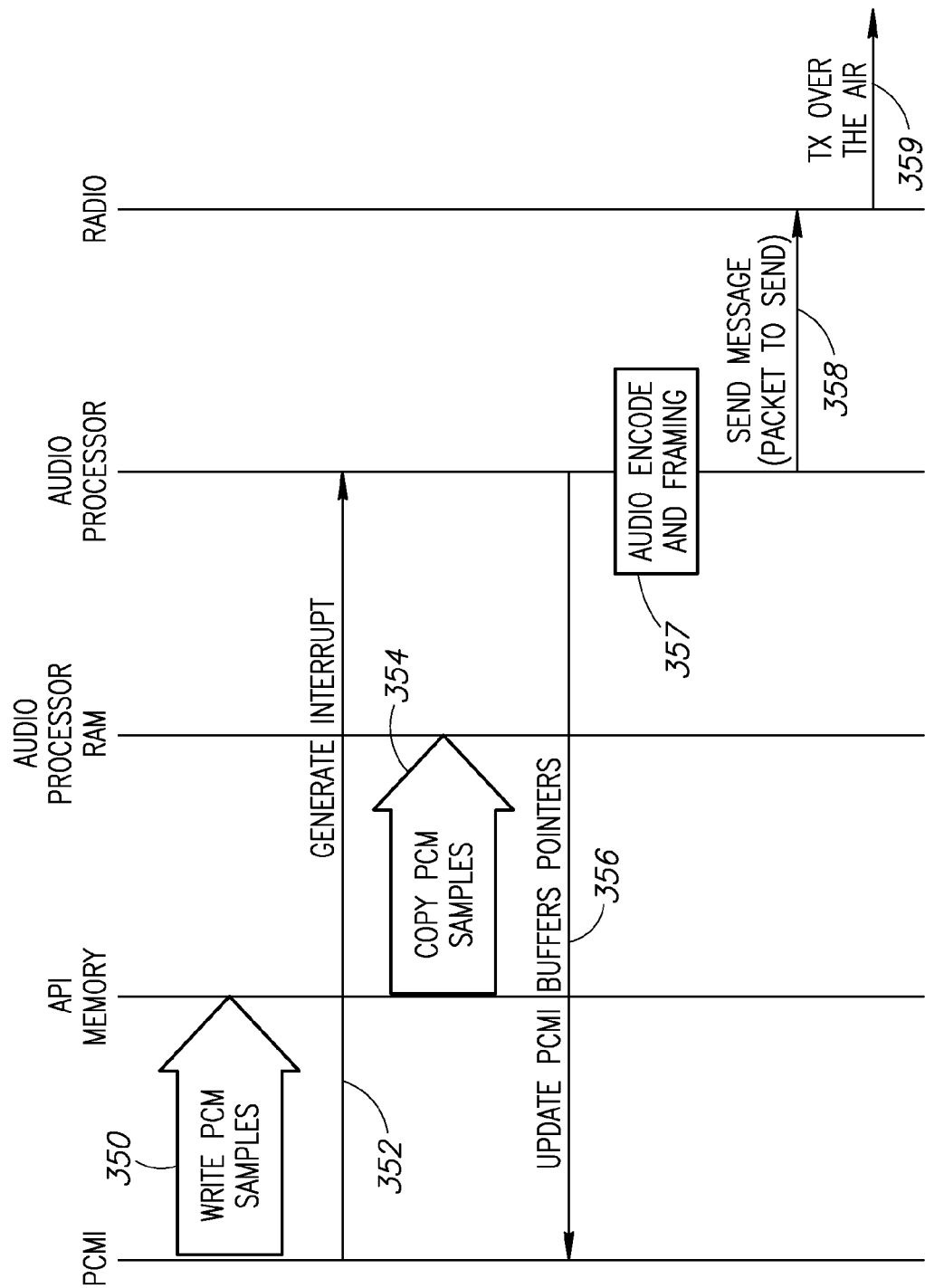
FIG. 14 is a diagram illustrating the audio processor data path and message flow between processor and controller entities.

A diagram illustrating the audio processor data path and message flow between processor and controller entities is shown in FIG. 14. With reference to 13 and 14, the audio input of the controller is a PCM bus 165 where the voice samples are written to API memory (350). The PCMI 412 copies the voice samples to the PCMI RX buffer 414 and generates an interrupt to the audio processor (352). The SBC codec 416 (160, FIG. 7) copies the samples to its memory (354) and processes (i.e. encodes) the samples. Encoded AVDTP audio packets are generated and encapsulated in L2CAP packets (357) and written to the IPC buffer 424 located in the API memory. When an L2CAP packet is ready, the write pointer of the IPC buffer is advanced (356). The read pointer of the IPC buffer 424 is advanced when the L2CAP packet has been sent to the radio (358) for transmission over the air (359).

Note that the IPC buffer is a dedicated buffer allocated for AVDTP packets. The IPC buffer is allocated in the API memory. The AVDTP buffer format is capable of supporting multiple SNK devices with different static headers. The payload is shared by all SNK devices. The structure of the IPC buffer comprises the fields listed below in Table 1.

TABLE 1

IPC Buffer Structure

| Field Name | Description |
| --- | --- |
| IPC Buffer Size | Total buffer size in bytes |
| Number Of Free Bytes | Number of free bytes in the IPC buffer |
| Owner | Indicates the AVDTP payload owner |
| Payload Length | AVDTP payload length in bytes |
| SNK Handle | Unique SNK handle |
| AVDTP Header | The AVDTP mini composer generates an AVDTP packet header per stream. |
| AVDTP Payload | SBC frames packed into AVDTP packet payload. The AVDTP payload is the same for all SNK devices. |

Figure 15:
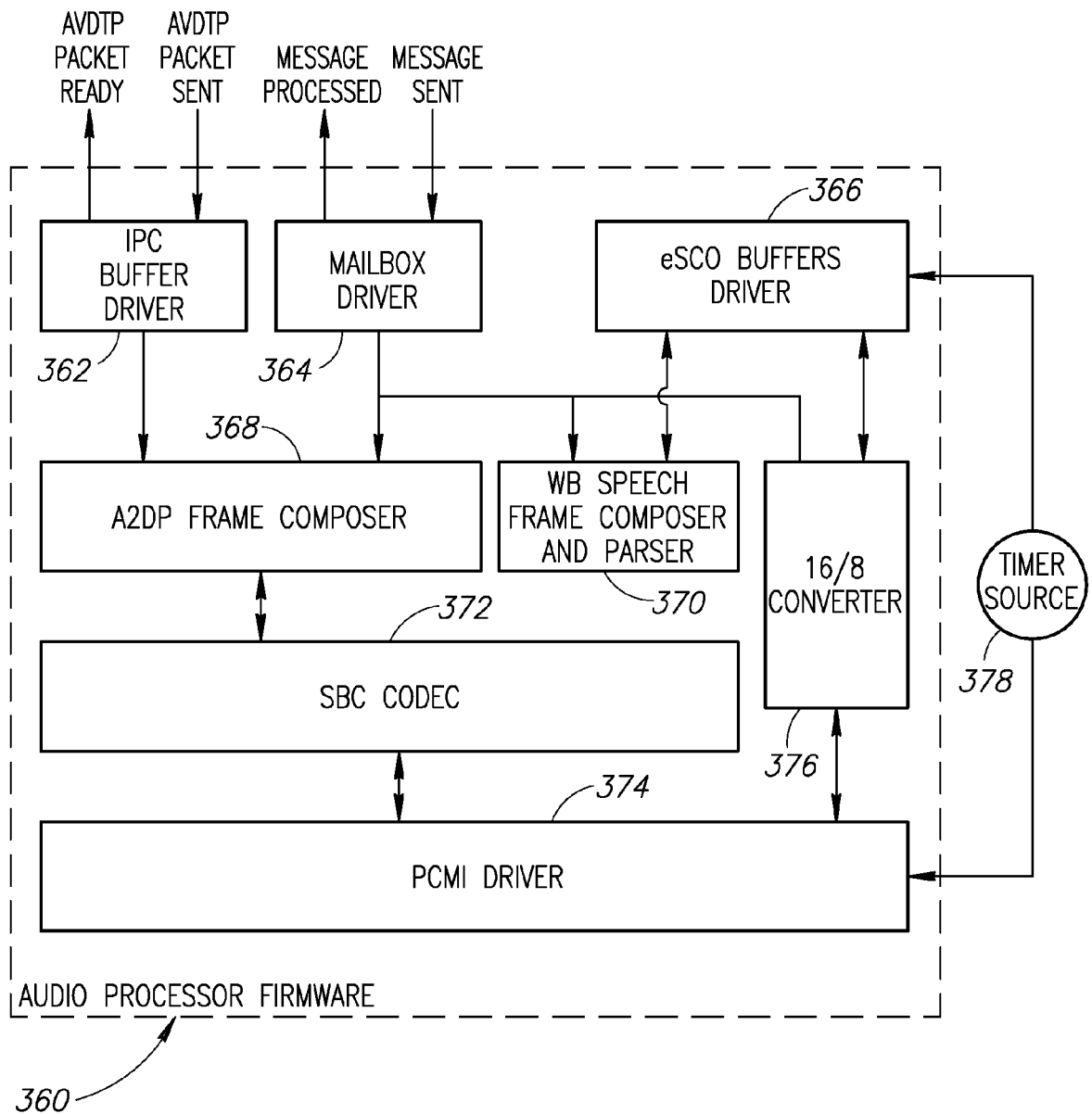
FIG. 15 is a block diagram illustrating the audio processor firmware.

In the example embodiment presented herein, the audio processor firmware is interrupt driven and is executed in a single IRQ context. A block diagram illustrating the firmware tasks or blocks running on the audio processor is shown in FIG. 15. The firmware, generally referenced 360, comprises a PCMI driver task 374, SBC codec task 372, A2DP frame composer task 368, WB speech frame composer and parser task 370, 16/8 converter task 376, IPC buffer driver task 362, mailbox driver task 364, eSCO buffers driver task 366 and coupled timer source task 378.

The SBC codec task 372 is operative to encode and decode SBC frames for WB speech and A2DP streams. The A2DP frame composer task 368 is operative to compose AVDTP packets. The WB speech frame composer and parser task 370 is responsible for the WB speech stream synchronization, adding and stripping and WB speech synchronization headers. The eSCO buffers driver task 366 provides read and write services for the eSCO buffers. The PCMI driver task 374 provides read and write services for the PCMI buffers.

In accordance with the invention, the controller integrated audio streaming mechanism comprises a dedicated HCI vendor specific (VS) Application Programming Interface (API). It is through this API that the host controls and configures the controller A2DP parameters. The API comprises commands for opening, closing, starting and stopping audio streams as well as configuration commands for single and multiple SNKs. Details of each of the API commands is provided hereinbelow.

HCI_VS_A3DP_Open_Stream (0xFD8C)

This command is called when the A2DP SNK has moved to the open state and has established the transport A2DP channel in order to open an A2DP entity in the controller. The command includes the protocol parameters needed for L2CAP and AVDTP packet construction. SBC and SARC parameters are applied using the HCI_VS_A3DP_CODEC_CONFIGURATION command described infra. The format of the Open Stream command is shown below in Table 2.

TABLE 2

Open Stream Command Structure

| Command | Opcode | Command Parameters | Return Parameters |
| --- | --- | --- | --- |
| HCI_VS_A3DP_Open_Stream | 0xFD8C | Connection Handle<br>L2CAP CID<br>AVDTP Version Parameter<br>AVDTP Payload Parameter | Status |

The command parameters for the Open Stream command are listed below in Table 3.

TABLE 3

Open Stream Command Parameters

| Parameter | Size | Value | Description |
| --- | --- | --- | --- |
| Connection Handle | 1 byte | 0x1-0x7 | ACL connection handle |
| L2CAP CID | 2 bytes | 0x0040-0xFFFF | L2CAP channel ID of the AVDTP data stream (refers to the L2CAP channel ID of the remote device) |
| L2CAP MTU | 2 bytes | 0x0030-0xFFFF | maximum size of payload data, in octets, that the upper layer entity is capable of accepting |
| AVDTP Version | 1 byte | 0x0-0x3 | AVDTP protocol header version parameter |
| AVDTP Payload | 1 byte | 0x0030-0xFFFF | identifies the format of the RTP payload and determines its interpretation by the application |
| Status (return param) | 1 byte | 0x00 | Command succeeded |
|  |  | 0x01-0xFF | Command failed |

HCI_VS_A3DP_Close_Stream (0xFD8D)

This command should be called when the A2DP SNK has moved to Idle state and has closed the transport A2DP channel. If a stream was started by the start stream command, it should be stopped by the stop stream command before it is closed. The format of the Close Stream command is shown below in Table 4.

TABLE 4

Close Stream Command Structure

| Command | Opcode | Command Parameters | Return Parameters |
| --- | --- | --- | --- |
| HCI_VS_A3DP_Close_Stream | 0xFD8C | Connection Handle | Status |

The command parameters for the Close Stream command are listed below in Table 5.

TABLE 5

Close Stream Command Parameters

| Parameter | Size | Value | Description |
| --- | --- | --- | --- |
| Connection Handle | 1 byte | 0x1-0x7 | ACL connection handle |
| Status (return param) | 1 byte | 0x00 | Command succeeded |
|  |  | 0x01-0xFF | Command failed |

HCI_VS_A3DP_Codec_Configuration (0xFD8E)

The Codec Configuration command configures the PCM source type, SBC encoder and SARC parameters. This command should not be called during streaming, meaning no stream has started using the Start Stream command. Note that the command can refer to a specific stream or to both active streams in a multiple SNK scenario. Note that in addition to the API call, the controller PCM codec should be configured as well using the commands HCI_VS_Write_CODEC_Config and HCI_VS_Write_CODEC_Config_Enhanced. The format of the Codec Configuration command is shown below in Table 6.

TABLE 6

Codec Configuration Command Structure

| Command | Opcode | Command Parameters | Return Parameters |
| --- | --- | --- | --- |
| HCI_VS_A3DP_Codec_Configuration | 0xFD8E | Audio Source | Status |
|  |  | PCM Input Sample Frequency |  |
|  |  | PCM Number of Channels |  |
|  |  | SBC Input Sample Frequency |  |
|  |  | SBC channel Mode |  |
|  |  | SBC Number of Blocks |  |
|  |  | SBC Number of Subbands |  |
|  |  | SBC Allocation Method |  |
|  |  | SBC Bit Pool Low Boundary |  |
|  |  | SBC Recommended Bit pull |  |
|  |  | SBC dynamic Bit Pull Enable |  |

The command parameters for the Codec Configuration command are listed below in Table 7.

TABLE 7

Codec Configuration Command Parameters

| Parameter | Size | Value | Description |
|---|---|---|---|
| Audio Source | 1 byte | 0x1-0x1 | Determines the audio source of the A2DP stream.<br>0 - Audio source is the host through the PCM bus<br>1 - Audio source is the internal controller's FM. |
| PCM Input Sample | 1 byte | 0x1-0x9 | The PCM sample frequency rate of the input PCM bus. This parameter is valid only when the audio source is the host. When this parameter is different from the SBC input sample frequency parameter the SARC will be used for sample rate conversion<br>0x01 - 8000 Hz<br>0x02 - 11025 Hz<br>0x03 - 12000 Hz<br>0x04 - 16000 Hz<br>0x05 - 22050 Hz<br>0x06 - 24000 Hz<br>0x07 - 32000 Hz<br>0x08 - 44100 Hz<br>0x09 - 48000 Hz |
| PCM Number of Channels | 1 byte | 0x0-0x2 | The number of channels (1 or 2) of the PCM input. This parameter is valid only when the audio source is the host. |
| SBC Input Sample Frequency | 1 byte | 0x0-0x3 | The sample frequency rate of the PCM input to SBC encoder. Note that when this parameter is different form the PCM input sample frequency, the SARC is used for sample rate conversion.<br>0x0 - 16000 Hz<br>0x1 - 32000 Hz<br>0x2 - 44100 Hz<br>0x3 - 48000 Hz |
| SBC channel Mode | 1 byte | 0x0-0x3 | Describes the channel mode used to encode a stream.<br>0x0 - MONO<br>0x1 - DUAL_CHNL<br>0x2 - STEREO<br>0x3 - JOINT_STEREO |
| SBC Number of Blocks. | 1 byte | 0x4, 0x8, 0xC, 0x10 | Number of SBC encoder blocks (4, 8, 12, 16) |
| SBC Number of Subbands | 1 byte | 0x4, 0x8, 0xC, 0x10 | Number of SBC subbands (4, 8, 12, 16) |
| SBC Allocation Method | 1 byte | 0x0-0x1 | SBC allocation method (SNR, Loudness)<br>0 - Loudness<br>1 - SNR |
| SBC Bit Pool Low Boundary | 1 byte | 0x39-0xFF | The lower boundary of the negotiated bit pool range. |
| SBC Recommended Bit pull | 1 byte | 0x39-0xFF | The HCPU can recommend for a specific bit pool value from the bit pool rate. The recommended bit pool value also uses as the high boundary in dynamic bit pool. |
| SBC dynamic Bit Pull Enable | 1 byte | 0x0-0x1 | Determines whether a dynamic bit pool mechanism should be used for performance/quality adjustment.<br>0 - Disable<br>1 - Enable |
| Status (return param) | 1 byte | 0x00<br>0x01-0xFF | Command succeeded<br>Command failed |

HCI_VS_A3DP_Multiple_SNK_Configuration (0xFD96)

The Multiple SNK Configuration command reconfigures SBC bit pool parameters for the case of multiple SNKs. The command is also operative to configure multiple SNK scenario dynamic bit pool parameters, which may differ from the regular dynamic bit pool behavior for a single SNK. If a second SNK was connected during an active streaming, new bit pool parameters can be configured without stopping the existing stream. If, however, other SBC configurations must be reconfigured as result of a second SNK connection, the stream must be stopped, reconfigured and only than both streams be started. The format of the Multiple SNK Configuration command is shown below in Table 8.

TABLE 8

Multiple SNK Configuration Command Structure

| Command | Opcode | Command Parameters | Return Parameters |
|---|---|---|---|
| HCI_VS_A3DP_Multiple_SNK_Configuration | 0xFD96 | SBC Bit Pool Low Boundary<br>SBC Recommended Bit Pool<br>SBC Multiple SNK Dynamic Bit Pool Enable<br>SBC Bit Pool Low Multiple Boundary | Status |

The command parameters for the Multiple SNK Configuration command are listed below in Table 9.

TABLE 9

Multiple SNK Configuration Command Parameters

| Parameter | Size | Value | Description |
|---|---|---|---|
| SBC Bit Pool Low Boundary | 1 byte | 0x39-0xFF | The lower boundary of the negotiated bit pool range. This value overrides the value previously configured in the Codec Configuration command. Generally, the latest command called always overrides the previous value. |
| SBC Recommended Bit pull | 1 byte | 0x39-0xFF | The HCPU can recommend a specific bit pool value from the bit pool rate. The recommended bit pool value is also uses as the high boundary in the dynamic bit pool. This value overrides the value previously configured in the Codec Configuration command. Generally, the latest command called always overrides the previous value. |
| SBC Multiple SNK Dynamic Bit Pool Enable | 1 byte | 0x0-0x1 | Determines whether a dynamic bit pool mechanism should be used for performance/quality adjustment, in multiple SNK scenarios. Dynamic bit pool in multiple SNK scenarios can degrade the audio quality of a certain SNK as result of bad RF of the other SNK, and therefore may be disabled. The respective parameter for single SNK scenario is not changed.<br>0 - Disable<br>1 - Enable |
| SBC Bit Pool Low Multiple Boundary | 1 byte | 0x39-0xFF | The lower boundary for decreasing the bit pool |
| Status (return param) | 1 byte | 0x00<br>0x01-0xFF | Command succeeded<br>Command failed |

HCI_VS_A3DP_Start_Stream (0xFD8F)

This Start Stream command starts the A2DP data streaming to the remote device. The host should initiate PCM audio data right after this API call. When no PCM data is accepted at the controller after this command call, no data will be sent to the peer device. The format of the Start Stream command is shown below in Table 10.

TABLE 10

Start Stream Command Structure

| Command | Opcode | Command Parameters | Return Parameters |
|---|---|---|---|
| HCI_VS_A3DP_Start_Stream | 0xFD8F | Connection Handle | Status |

The command parameters for the Start Stream command are listed below in Table 11.

TABLE 11

Start Stream Command Parameters

| Parameter | Size | Value | Description |
|---|---|---|---|
| Connection Handle | 1 byte | 0x1-0x7 | ACL connection handle |
| Status (return param) | 1 byte | 0x00<br>0x01-0xFF | Command succeeded<br>Command failed |

HCI_VS_A3DP_Stop_Stream (0xFD90)

The Stop Stream command functions to stop the SBC data streaming to the remote device. An input parameter determines whether the current internal buffers are transmitted to the remotes device(s) and then flushed (soft flush), or should be flushed immediately (hard flush). This option may be needed if the stream was stopped between songs for reconfiguration, so that the song ending should be heard by the user and not flushed. A VS event is generated at the completion of the operation if requested. The format of the Stop Stream command is shown below in Table 12.

TABLE 12

Stop Stream Command Structure

| Command | Opcode | Command Parameters | Return Parameters |
|---|---|---|---|
| HCI_VS_A3DP_Stop_Stream | 0xFD90 | Connection Handle<br>Flush Flag<br>Generate Stop Event | Status |

The command parameters for the Stop Stream command are listed below in Table 13.

TABLE 13

Stop Stream Command Parameters

| Parameter | Size | Value | Description |
|---|---|---|---|
| Connection Handle | 1 byte | 0x1-0x7 | ACL connection handle |
| Flush Flag | 1 byte | 0x1-0x1 | Determines whether the current internal buffers should be transmitted to the remote device or should be flushed immediately.<br>Values:<br>0 - Transmit internal buffers before flush (soft flush.<br>1 - Immediate flush of buffers (hard flush). |

TABLE 13-continued

Stop Stream Command Parameters

| Parameter | Size | Value | Description |
|---|---|---|---|
| Generate Stop Event | 1 byte | 0x1-0x1 | Determines whether a stop stream event will be generated as soon as the stream is stopped. To be used in Soft Flush. |
| Status (return param) | 1 byte | 0x00 | Command succeeded |
| | | 0x01-0xFF | Command failed |

HCI_VS_APR_Enable (0xFD92)

The Enable command is used for enabling the audio processor (APR) features, i.e. A2PD, WBS, FM converter. Preferably, the APR is disabled when not in use in order to reduce current consumption. The default APR state is disabled. The format of the Enable Stream command is shown below in Table 14.

TABLE 14

Enable Command Structure

| Command | Opcode | Command Parameters | Return Parameters |
|---|---|---|---|
| HCI_VS_AVPR_Enable | 0xFD92 | Enable/Disable APR | Status |

The command parameters for the Enable are listed below in Table 15.

TABLE 15

Enable Command Parameters

| Parameter | Size | Value | Description |
|---|---|---|---|
| Enable/Disable APR | 1 byte | 0x1-0x1 | Enable/Disable the APR clock. Enable also reloads the APR code. 1 - Enable 0 - Disable |
| Status (return param) | 1 byte | 0x00 | Command succeeded |
| | | 0x01-0xFF | Command failed |

Flow Sequence

When a stream has been opened and audio data is streaming, SBC frame encoding is performed on a periodic basis. Each period comprises a few operations that are performed sequentially as shown in the diagram of Figure illustrating the timing of the audio processor flow sequence. In the example embodiment presented herein, each operation is interrupt driven. All interrupts priorities are same, so operations cannot jump ahead of each other. The time period is derived from the PCM input and SBC encoder characteristics, such that at the end of each cycle all input PCM data is encoded to SBC frames.

The PCM data needed for one SBC frame is shown in Table 16 below:

TABLE 16

PCM Data Per Frame in bytes (For 8 subbands)

| | # Blocks | | | |
|---|---|---|---|---|
| # Channels | 4 | 8 | 12 | 16 |
| 1 | 64 | 128 | 192 | 256 |
| 2 | 128 | 256 | 384 | 512 |

As is shown be seen in the table, the maximal PCM block needed for one SBC frame encoding is 512 bytes, when all values are dividers of 512. Therefore, each cycle encodes 512 or 384 PCM bytes to SBC. In the worse case, a 512 byte PCM cycle is less than 2.66 milliseconds (which is equivalent to a 384 cycle of 2 milliseconds).

Figure 16:
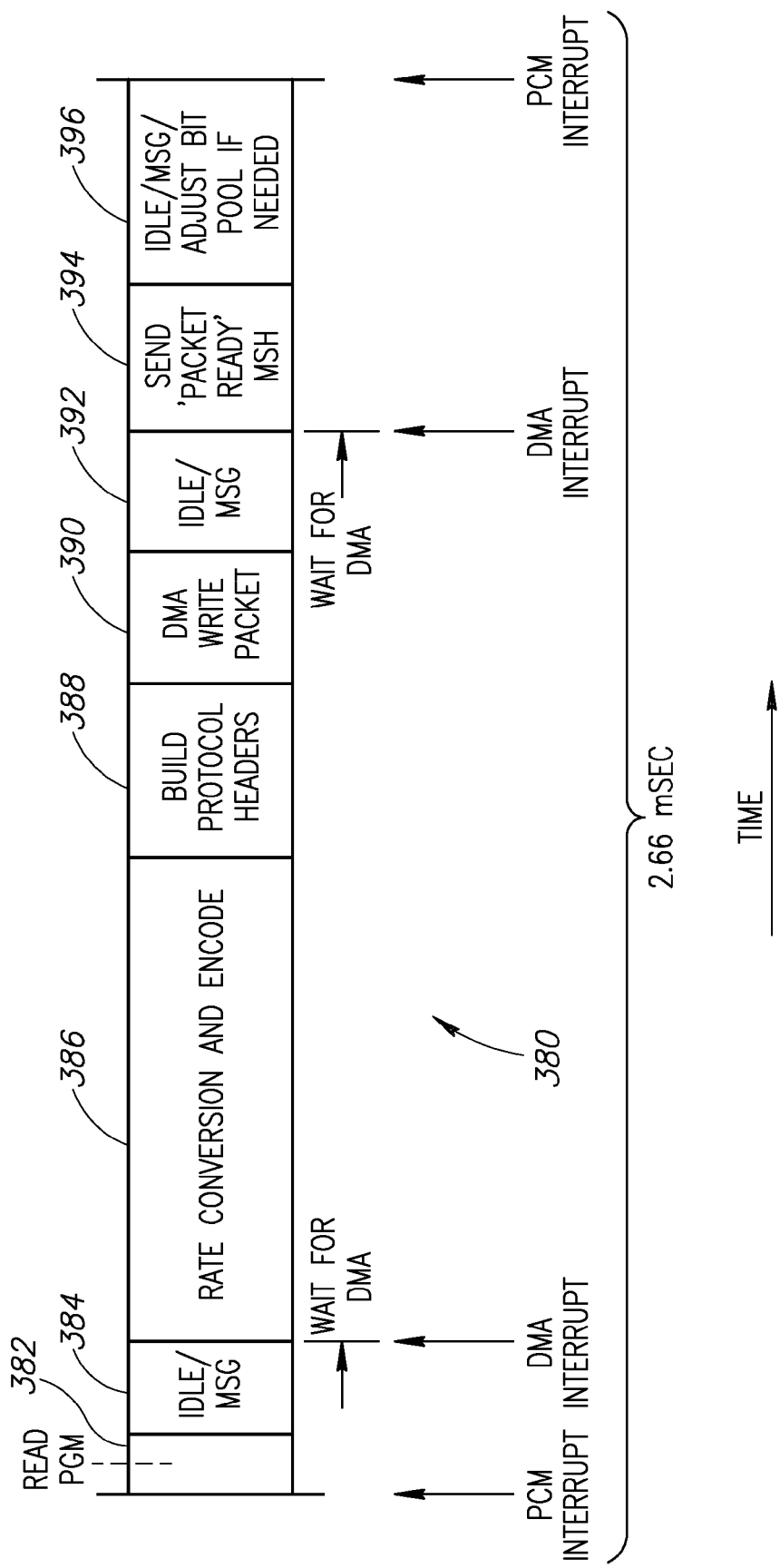
FIG. 16 is a diagram illustrating the timing of the audio processor flow sequence.
Figure 17:
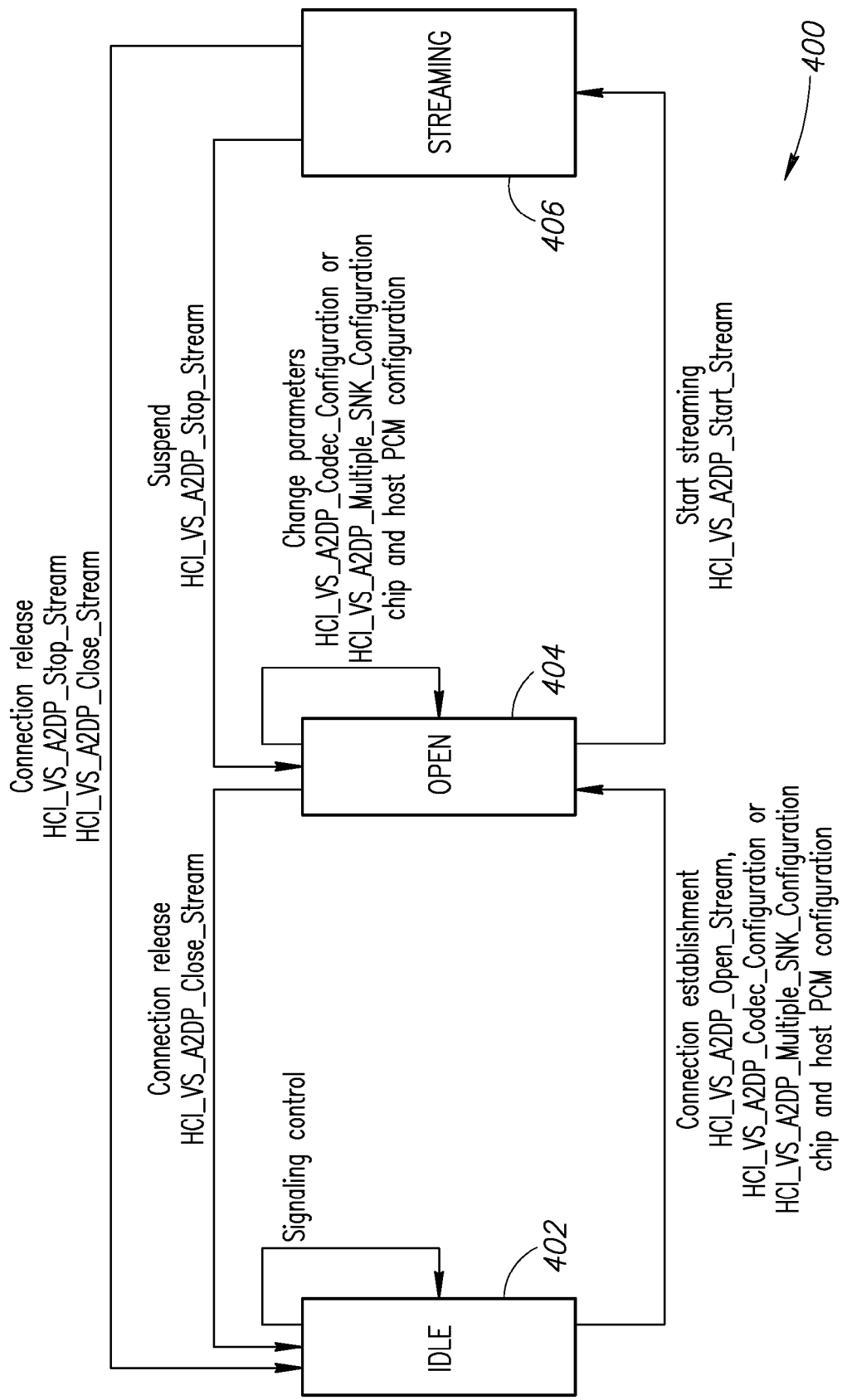
FIG. 17 is a diagram illustrating the audio processor state machine.

With reference to FIG. 16, the period, generally referenced 38, comprises a read PCM segment 382, Idle/Msg segment 384, rate conversion and encode 386, build protocol headers 388, DMA write packet 390, Idle/Msg 392, send packet ready message 394 and Idle/Msg/adjust bit pool 396.

Each period starts with a PCM IF driver interrupt indicating that a PCM block is ready at the API memory. At this point, the PCM IF is called to read the PCM audio data into a data memory buffer (in the context of the PCM interrupt). The firmware remains in idle until a DMA interrupt is generated, indicating PCM data was copied to data memory. During the idle state, messages can be accepted as well. Thus, the DMA interrupt may be handled only after massage processing completes.

In the context of the DMA interrupt, the following operations are performed: (1) SARC and SBC calculations; (2) protocol headers processing; and (3) sending DMA write requests. Here too, the firmware idles until a DMA interrupt is generated, indicating PCM data was copied to data memory. During the idle state, messages can be accepted as well. Thus, the DMA interrupt may be handled only after massage processing completes.

In the context of the next DMA interrupt, an interrupt is generated indicating a packet is ready. Other general operations such as bit pool dynamic adjustment are performed in the time remaining in the period. Once all operations are complete, the audio processor idles again until the next interrupt. Note that the message interrupts can be handled in the idle parts of the cycle. Therefore, the cycle can be longer than the required time of 2.66 milliseconds. It is assumed that a message interrupt handling process time is negligible comparing to the SBC calculation duration, so that the cycle time period is significantly affected. In addition, no more than two messages are expected to be received in one cycle, i.e. one packet sent message and a control message.

State Machine

A diagram illustrating the audio processor state machine is shown in FIG. 16. The state machine, generally referenced 400, comprises an Idle state 402, Open state 404 and a Streaming state 406. In operation, the A2DP mechanism of the invention can be in either a streaming state 406 or a non-streaming state, i.e. the Open state 404 or Idle state 402. In the streaming state, input PCM data is processed and L2CAP packets of encoded audio data are output. The streaming state has two modes: one for single channel streaming and another for multiple channel streaming. The only difference between the states is the IPC buffer data composing, since in a multiple SNK scenario two data headers are built.

If in the Idle state, establishment of a connection causes a move to the Open state. The Open Stream, Codec Configuration or Multiple SNK Configuration APIs are used to establish the connection. The connection establishment API commands are used when the host wants to establish a streaming connection with a Bluetooth device.

When the device wants to start a stream (or resume streaming), the Start Stream command is executed to change the state from the Open state to the Streaming state. Typically, the Start Streaming command is initiated based on a user initiated action or the occurrence of an internal event.

When in the Open state, a connection release causes the L2CAP channels to be released. The connection release is performed using the Close Stream command which changes the state from the Open state to the Idle state. Note that the connection release procedure may be initiated from both the Open and Streaming states and sets the state at Idle for both devices.

When the device wants to suspend the audio streaming, the suspend procedure is initiated to change the state from the Streaming state to the Open state. The Stop Stream command is used to perform this procedure. The Stop Stream command is initiated by a user initiated action or the occurrence of an internal event. A connection release procedure, initiated by the Stop Stream and Close Stream API commands moves the mechanism from the Streaming state to the Idle state.

To change application service parameters, both devices must be in the Open state. If the mechanism is in the Streaming state, the suspend procedure described supra is executed beforehand to suspend the stream and change the state to the Open state for both devices. The change parameters procedure is initiated by a user action or by the occurrence of an internal event. After executing this procedure, the state of the devices remains in the Open state. The Start Stream command described supra must be executed in order to resume the audio stream. The mechanism remains in the Open state upon execution of the Codec Configuration or Multiple SNK Connection commands while in the Open state.

The Signaling Control procedure is used to recover from a loss of a signaling message, which could result in inconsistencies in the host, Bluetooth controller and Bluetooth device.

In similar fashion, partitioning can also be adapted to the SNK side of A2DP, reducing the required processing power of the host and enabling smoother integration. For the SNK implementation, a similar partitioning and associated mechanism is used on the SNK side as is used on the SRC side. On the SNK side, the controller integrates the receive packets over the air, parses them and sends the data over the dedicated data interface (e.g., PCM/I2S for audio data).

Figure 18:
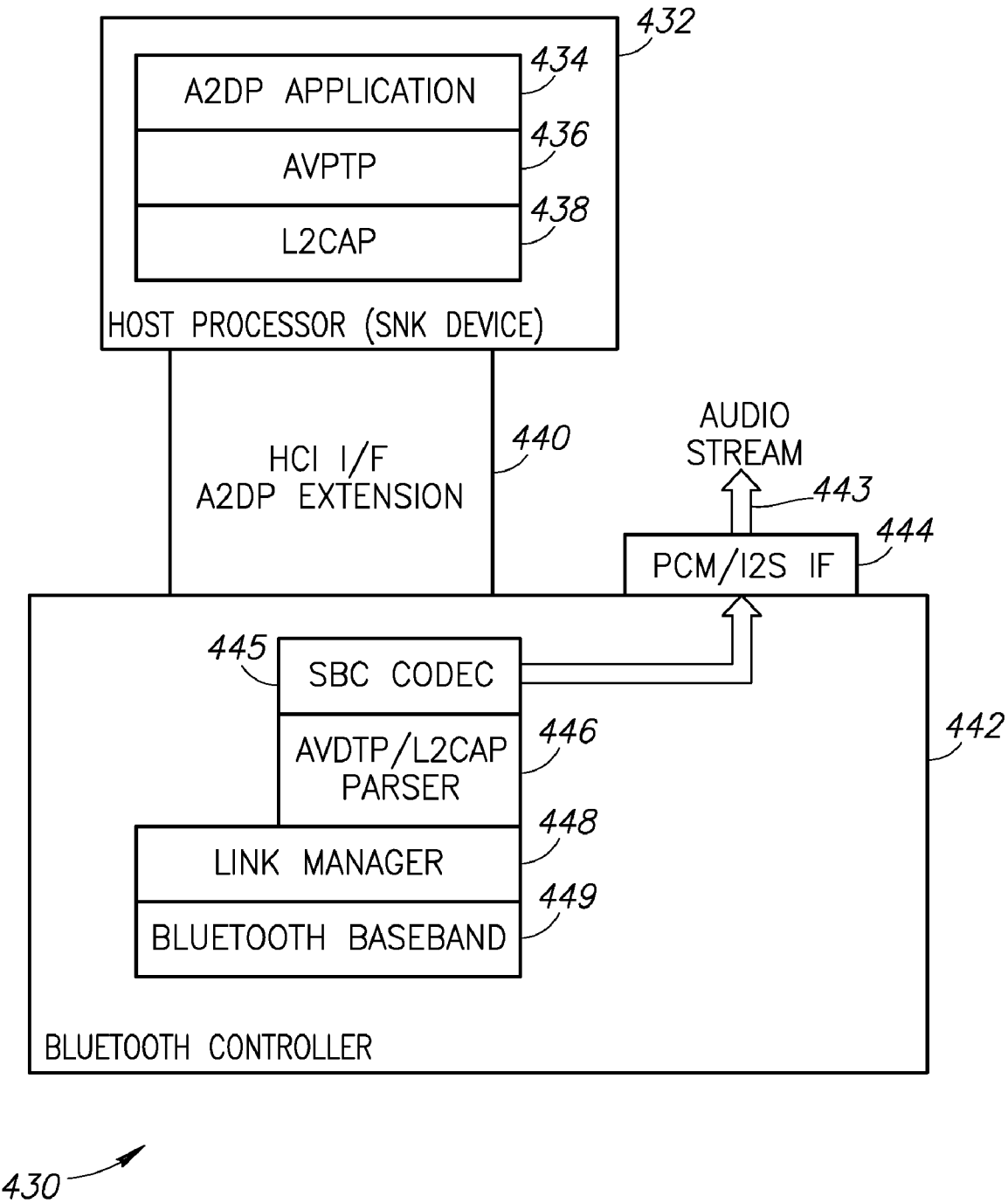
FIG. 18 is a diagram illustrating an example embodiment of the SNK based A2DP audio streaming implementation of the present invention.

A diagram illustrating an example embodiment of the SNK based A2DP audio streaming implementation of the present invention is shown in FIG. 18. The system, generally referenced 430, comprises a Bluetooth controller 442 in communication with a host processor 432 via HCI interface (I/F) and A2DP extension 440. The host processor comprises A2DP application layer 434, AVDTP layer 436 and L2CAP layer 438. The controller comprises SBC codec 445, AVDTP/L2CAP parser 446, link manager 448 and Bluetooth baseband 449.

In operation, the Bluetooth controller 442 receives the signal over the air and is demodulated, decoded and processed by the Bluetooth baseband 449. AVDTP/L2CAP packets output from the baseband are forwarded to the AVDTP/L2CAP parser 446 via the link manager 448. The L2CAP packets are parsed into AVDTP packets which are subsequently decoded by the SBC codec 445 into the audio stream data. The audio stream data 443 is sent to the host processor 432 via the PCM/I2S interface 444 for playback to the user.

Thus, in accordance with the invention, the audio codec and the AVDTP/L2CAP parser are integrated into the Bluetooth controller. The PCM/I2S provides a dedicated interface to forward the PCM audio samples. The AVDTP and L2CAP parser is responsible for parsing AVDTP audio packets based on preconfigured AVDTP parameters, both components of which are configured by the host processor.

Note that the AVDTP 436, L2CAP 438 and A2DP 434 application running on the host are responsible for the protocol functions as in the standard implementation. Note also that the invention uses the standard Bluetooth HCI with appropriate extensions to control the AVDTP/L2CAP parser and codec components.

Figure 19:
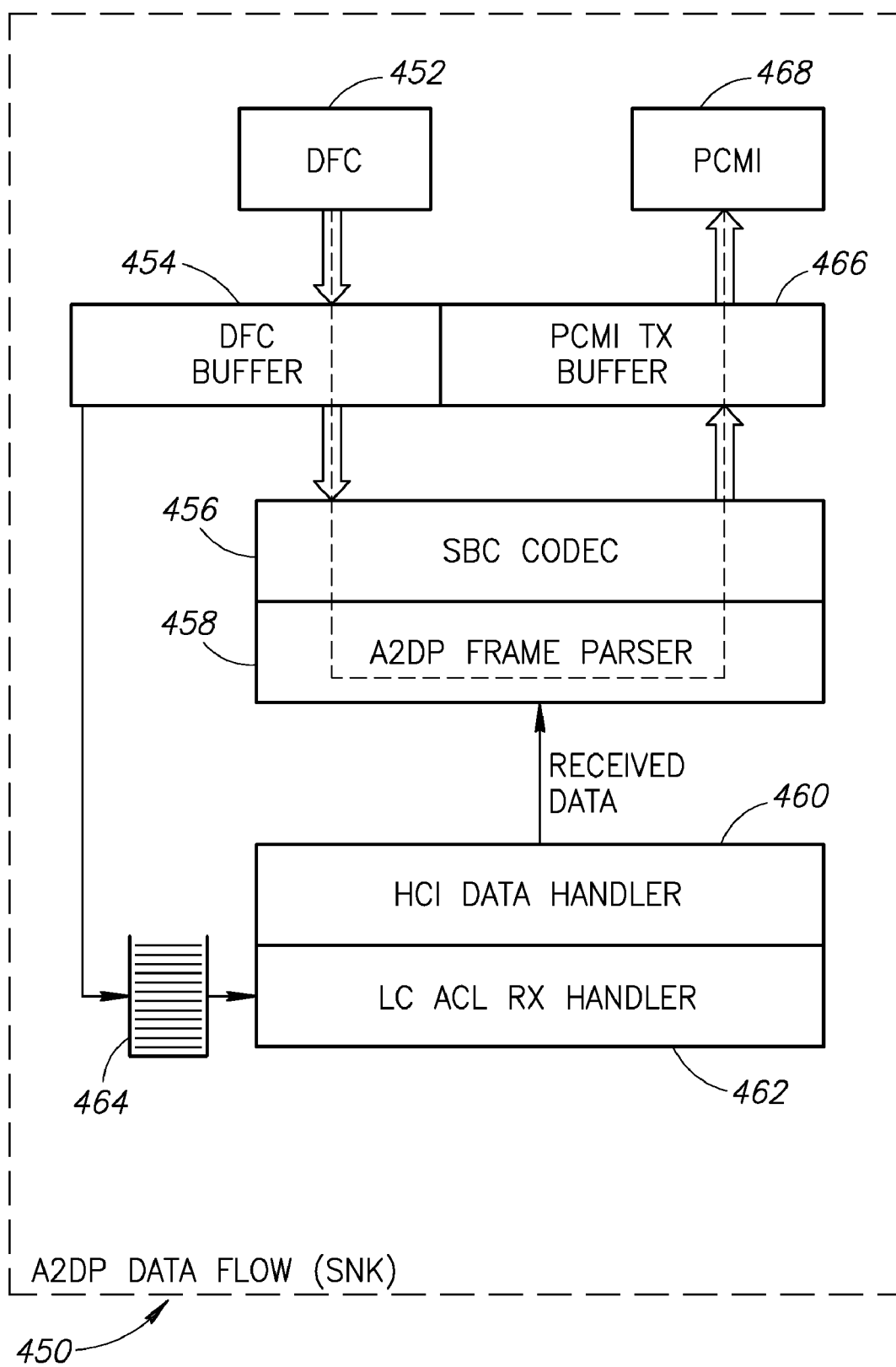
FIG. 19 is a diagram illustrating the SNK based A2DP over PCM data flow.

A diagram illustrating the SNK based A2DP over PCM data flow is shown in FIG. 19. The data flow, generally referenced 450, comprises Data Flow Controller (DFC) 452, Inter Processor Communication (IPC) buffer 454, SBC codec 456, A2DP frame parser 458, queue 464, LC ACL RX handler 462, HCI data handler 460, PCMI TX buffer 466 and PCM interface (PCMI) 468. The message flow between the controller and processor entities is similar to that of FIG. 14 but in the reverse direction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of encoding streaming audio in a Bluetooth controller coupled to a communications channel, said method comprising the steps of:

receiving audio streaming data from a host system utilizing a host control application programming interface (API);

encoding said audio streaming data to generate encoded audio data therefrom; and assembling transmit packets incorporating said encoded audio data for transmission over said communications channel, wherein said communications channel comprises a Bluetooth wireless link, wherein said transmit packets comprise Audio/Video Distribution Transport Protocol (AVDTP) packets; and wherein said host control API comprises a multiple sink configuration command operative to configure a plurality of advanced audio distribution profile (A2DP) transport channels in said Bluetooth controller.

2. The method according to claim 1, wherein said audio streaming data comprises pulse code modulated (PCM) data.

3. The method according to claim 1, wherein said step of encoding comprises encoding pulse code modulated (PCM) input data to subband codec (SBC) format.

4. The method according to claim 1, wherein data path processing is performed by said controller while control functions and associated signaling channel are performed by said host system.

5. A method of encoding streaming audio in a Bluetooth controller, said method comprising the steps of:
- receiving pulse code modulated (PCM) format audio streaming data from a host system utilizing a host control application programming interface (API);
- encoding said PCM audio streaming data to subband codec (SBC) format; and
- generating transmit packets incorporating said SBC encoded audio data for transmission over a Bluetooth link,
- wherein said host control API comprises a multiple sink configuration command operative to configure a plurality of advanced audio distribution profile (A2DP) transport channels in said Bluetooth controller.

6. The method according to claim 5, wherein data path processing is performed by said Bluetooth controller while control functions and associated signaling channel are performed by said host system.

7. The method according to claim 5, wherein said transmit packets comprise Audio/Video Distribution Transport Protocol (AVDTP) packets.

8. The method according to claim 5, wherein said host control API enables said host system to control and configure said Bluetooth controller.

9. The method according to claim 5, wherein said host control API comprises an open stream command operative to establish an advanced audio distribution profile (A2DP) transport channel in said Bluetooth controller.

10. The method according to claim 5, wherein said host control API comprises a close stream command operative to close an advanced audio distribution profile (A2DP) transport channel in said Bluetooth controller.

11. The method according to claim 5, wherein said host control API comprises a codec configuration command operative to configure an SBC codec within said Bluetooth controller.

12. The method according to claim 5, wherein said host control API comprises a start stream command operative to start SBC data streaming to a remote Bluetooth device.

13. The method according to claim 5, wherein said host control API comprises a stop stream command operative to stop SBC streaming to a remote Bluetooth device.

14. A single chip Bluetooth controller, comprising:
- a Bluetooth radio for establishing a link to a remote device;
- a host control application programming interface (API) defining a plurality of commands for controlling and configuring said Bluetooth controller;
- a host interface operative to receive a pulse code modulated (PCM) format input audio data stream from a host system utilizing said host control API;
- an audio encoder operative to encode said audio data stream into subband codec (SBC) format; and
- a profile data packet composer operative to encapsulate said SBC formatted audio data stream to generate Bluetooth transmit packets therefrom for transmission by said Bluetooth radio over said link to said remote device,
- wherein said host control API comprises a multiple sink configuration command operative to configure a plurality of advanced audio distribution profile (A2DP) transport channels in said Bluetooth controller.

15. The controller according to claim 14, wherein said host control API comprises an open stream command operative to establish an advanced audio distribution profile (A2DP) transport channel in said Bluetooth controller.

16. The controller according to claim 14, wherein said host control API comprises a close stream command operative to close an advanced audio distribution profile (A2DP) transport channel in said Bluetooth controller.

17. The controller according to claim 14, wherein said host control API comprises a codec configuration command operative to configure an SBC codec within said Bluetooth controller.

18. The controller according to claim 14, wherein said host control API comprises a start stream command operative to start SBC data streaming to a remote Bluetooth device.

19. The controller according to claim 14, wherein said host control API comprises a stop stream command operative to stop SBC streaming to a remote Bluetooth device.

20. The controller according to claim 14, wherein said Bluetooth transmit packets comprise Audio/Video Distribution Transport Protocol (AVDTP) packets.

* * * * *